United States Patent
Liu et al.

(10) Patent No.: US 12,330,873 B2
(45) Date of Patent: Jun. 17, 2025

(54) INVENTORY REGION INTEGRATING GOODS PREPARATION AND PICKING, AND INVENTORY MANAGEMENT SYSTEM AND METHOD

(71) Applicant: BEIJING GEEKPLUS TECHNOLOGY CO. LTD., Beijing (CN)

(72) Inventors: Kai Liu, Beijing (CN); Jinguo Li, Beijing (CN); Mengdi Wang, Beijing (CN)

(73) Assignee: BEIJING GEEKPLUS TECHNOLOGY CO. LTD., Beijing (CN)

( * ) Notice: Subject to any disclaimer, the term of this patent is extended or adjusted under 35 U.S.C. 154(b) by 860 days.

(21) Appl. No.: 17/288,820

(22) PCT Filed: Aug. 23, 2019

(86) PCT No.: PCT/CN2019/102365
§ 371 (c)(1),
(2) Date: Apr. 26, 2021

(87) PCT Pub. No.: WO2020/082881
PCT Pub. Date: Apr. 30, 2020

(65) Prior Publication Data
US 2021/0395012 A1    Dec. 23, 2021

(30) Foreign Application Priority Data

Oct. 26, 2018  (CN) ......................... 201811261310.3
Apr. 10, 2019  (CN) ......................... 201910285592.9

(51) Int. Cl.
*B65G 1/137*    (2006.01)

(52) U.S. Cl.
CPC ................................ *B65G 1/1373* (2013.01)

(58) Field of Classification Search
CPC .................................................... B65G 1/1373
See application file for complete search history.

(56) References Cited

U.S. PATENT DOCUMENTS 9,365,348 B1 *    6/2016    Agarwal .............. G06Q 10/087
2014/0277691 A1 *  9/2014    Jacobus .................... B66F 9/24
                                                              700/216
(Continued)

FOREIGN PATENT DOCUMENTS

CN    101125603 A    2/2008
CN    104903921 A    9/2015
(Continued)

*Primary Examiner* — Kyle O Logan
(74) *Attorney, Agent, or Firm* — Hodgson Russ LLP

(57) ABSTRACT

An inventory region integrating goods preparation and picking, and inventory management system and method. The inventory region comprises: a plurality of high-level shelves and a plurality of picking shelves, wherein any high-level shelf of the plurality of high-level shelves comprises a shelf board, and the shelf board partitions the high-level shelf into at least two levels; and a picking shelf is placed at a bottom level of at least one high-level shelf of the plurality of high-level shelves, and at least one storage container is placed on each of the other floors except for the bottom level where the picking shelf is placed. Inventory articles, which can be picked, are accommodated on each of the picking shelves, and inventory articles for replenishing the picking shelves are accommodated in the storage container.

17 Claims, 20 Drawing Sheets

(56) References Cited

U.S. PATENT DOCUMENTS

| | | | | |
|---|---|---|---|---|
| 2015/0210472 | A1* | 7/2015 | Nakamura | B65G 1/0435 |
| | | | | 414/661 |
| 2017/0081846 | A1 | 3/2017 | Doggett et al. | |
| 2017/0203920 | A1* | 7/2017 | Otto | B66F 9/24 |
| 2017/0334645 | A1* | 11/2017 | Otto | B66F 9/07504 |
| 2018/0127211 | A1* | 5/2018 | Jarvis | B65G 1/1373 |
| 2018/0127212 | A1* | 5/2018 | Jarvis | B65G 1/1375 |
| 2018/0265297 | A1 | 9/2018 | Nakano et al. | |
| 2018/0339858 | A1* | 11/2018 | Iwata | B65G 1/0435 |
| 2021/0395012 | A1 | 12/2021 | Liu et al. | |

FOREIGN PATENT DOCUMENTS

| | | |
|---|---|---|
| CN | 206032359 U | 3/2017 |
| CN | 107555056 A | 1/2018 |
| CN | 107657410 A | 2/2018 |
| CN | 107697527 A | 2/2018 |
| CN | 107963385 A | 4/2018 |
| CN | 108107862 A | 6/2018 |
| CN | 108408315 A | 8/2018 |
| CN | 108596540 A | 9/2018 |
| CN | 108726062 A | 11/2018 |
| CN | 109160169 A | 1/2019 |
| CN | 109255569 A | 1/2019 |
| CN | 109592280 A | 4/2019 |
| CN | 109160169 B | 8/2019 |
| CN | 109911503 B | 5/2020 |
| DE | 20 2012 002 614 U1 | 5/2012 |
| EP | 2 610 944 A1 | 7/2013 |
| EP | 3 872 009 A1 | 9/2021 |
| JP | 2007-210773 A | 8/2007 |
| JP | 5294001 B2 | 9/2013 |
| JP | 2017-141102 A | 8/2017 |
| JP | 2018-043832 A | 3/2018 |
| JP | 2021-529712 A | 11/2021 |
| JP | 7018547 B2 | 2/2022 |
| WO | WO 01/42111 A1 | 6/2001 |
| WO | WO 2017/015011 A1 | 1/2017 |
| WO | WO 2017/179577 A1 | 10/2017 |
| WO | WO 2020/082881 A1 | 4/2020 |

* cited by examiner in a case where it is determined that an item in the picking zone needs to be replenished, the control server generates a replenishment task for the item that needs to be replenished and sends a first transporting instruction to a first robot according to the replenishment task ~ S310 in response to the first transporting instruction, the first robot carries the item associated with the replenishment task from the stocking zone to the picking zone as indicated by the first transporting instruction to allow the item to be replenished into an item container in the picking zone ~ S320

FIG. 3 the control server calculates an inventory amount of the items in a picking zone, and if the inventory amount is less than or equal to a preset security inventory threshold, it is determined that the item needs to be replenished ~ S410 the control server determines a pre-replenishment amount of the item according to a difference between a security inventory threshold and the inventory amount ~ S420 the control server determines an actual replenishment amount of the item according to the pre-replenishment amount and a storage specification of the item in the stocking zone ~ S430 the control server generates the replenishment task for the item according to the actual replenishment amount of the item ~ S440 the control server sends the first transporting instruction to the first robot according to the replenishment task ~ S450 in response to the first transporting instruction, the first robot carries an item associated with the replenishment task from the stocking zone to the picking zone as indicated by the first transporting instruction to allow the item to be replenished into an item container in the picking zone ~ S460

FIG. 4

```
┌─────────────────────────────────────────────────────────────┐
│ in a case where it is determined that an item in the picking│
│ zone needs to be replenished, the control server generates a│
│ replenishment task for the item that needs to be replenished│──── S310
│ and sends a first transporting instruction to a first robot │
│ according to the replenishment task                         │
└─────────────────────────────────────────────────────────────┘
                              ↓
┌─────────────────────────────────────────────────────────────┐
│ in response to the first transporting instruction, the first│
│ robot carries the item associated with the replenishment    │
│ task from the stocking zone to the picking zone as indicated│──── S320
│ by the first transporting instruction to allow the item to  │
│ be replenished into an item container in the picking zone   │
└─────────────────────────────────────────────────────────────┘
```

FIG. 9

```
┌─────────────────────────────────────────────────────────────┐
│ the control server calculates an inventory amount of the    │
│ items in a picking zone, and if the inventory amount is less│──── S410
│ than or equal to a preset security inventory threshold, it  │
│ is determined that the item needs to be replenished         │
└─────────────────────────────────────────────────────────────┘
                              ↓
┌─────────────────────────────────────────────────────────────┐
│ the control server determines a pre-replenishment amount of │
│ the item according to a difference between a security       │──── S420
│ inventory threshold and the inventory amount                │
└─────────────────────────────────────────────────────────────┘
                              ↓
┌─────────────────────────────────────────────────────────────┐
│ the control server determines an actual replenishment amount│
│ of the item according to the pre-replenishment amount and a │──── S430
│ storage specification of the item in the stocking zone      │
└─────────────────────────────────────────────────────────────┘
                              ↓
┌─────────────────────────────────────────────────────────────┐
│ the control server generates the replenishment task for the │
│ item according to the actual replenishment amount of the    │──── S440
│ item                                                        │
└─────────────────────────────────────────────────────────────┘
                              ↓
┌─────────────────────────────────────────────────────────────┐
│ the control server sends the first transporting instruction │──── S450
│ to the first robot according to the replenishment task      │
└─────────────────────────────────────────────────────────────┘
                              ↓
┌─────────────────────────────────────────────────────────────┐
│ in response to the first transporting instruction, the first│
│ robot carries an item associated with the replenishment task│
│ from the stocking zone to the picking zone as indicated by  │──── S460
│ the first transporting instruction to allow the item to be  │
│ replenished into an item container in the picking zone      │
└─────────────────────────────────────────────────────────────┘
```

FIG. 10

INVENTORY REGION INTEGRATING GOODS PREPARATION AND PICKING, AND INVENTORY MANAGEMENT SYSTEM AND METHOD

CROSS-REFERENCE TO RELATED APPLICATIONS

The present application is a National Phase entry of PCT Application No. PCT/CN2019/102365, filed Aug. 23, 2019, which claims the benefit of priorities to the following two applications, both of which are incorporated herein by reference,
1) Chinese application No. 201910285592.9, titled "INVENTORY REGION INTEGRATING GOODS PREPARATION AND PICKING, AND INVENTORY MANAGEMENT SYSTEM AND METHOD", filed with the Chinese National Intellectual Property Administration on Apr. 10, 2019, and
2) Chinese application No. 201811261310.3, titled "AUTOMATIC REPLENISHMENT WAREHOUSING SYSTEM AND AUTOMATIC REPLENISHMENT METHOD", filed with the Chinese National Intellectual Property Administration on Oct. 26, 2018.

TECHNICAL FIELD

Embodiments of the present disclosure relate to the technical field of logistics warehousing, and in particular to an inventory zone, an inventory management system and an inventory management method for preparing and picking goods.

BACKGROUND

With the rapid development and maturity of e-commerce, e-commerce has played an increasingly important role in consumer life, and the number of user orders grows exponentially each year. Moreover, users have put forward higher requirements for e-commerce services. Therefore, how to complete orders and fulfill contracts efficiently, cost-savingly, flexibly and accurately is a huge challenge faced by every e-commerce service company.

Besides, the rapid development of e-commerce requires a warehouse capable of storing items in large numbers and various species. Therefore, the warehouse is required to be able to quickly complete the order picking, and it is also required to improve the storage capacity of the warehouse, so that the overall storage efficiency of the warehouse can be improved.

At present, in order to improve the storage efficiency of the warehouse, it is general to divide the warehouse into stocking zones to store a large quantity of stocks when planning the warehouse, such as using high shelves to increase the storage of items. In addition, the warehouse is further divided into picking zones for picking items based on a "goods-to-people" mode, that is, a mode of using a robot to transport a picking shelf at a picking zone to a picking station, and then the staff or other automated equipment at the picking station pick out the items required by the order from the picking shelf. In addition, the picking zone can be replenished with the bulk items stored in the stocking zone when the picking zone is out of stock, or the picking zone can be replenished periodically.

However, for a warehouse with a fixed area, once the stocking zone is expanded, the picking zone is relatively compressed; although the item storage efficiency of the stocking zone is improved, the shrinking of the picking zone inevitably suppresses the number of picking stations, which in turn adversely affecting the picking efficiency. On the contrary, once the picking zone is enlarged, the stocking zone is relatively compressed; although the picking efficiency of the picking zone is improved, the shrinking of the stocking zone adversely affects the storage efficiency as well. That is, the related art cannot balance the picking efficiency and the storage efficiency of the warehouse.

SUMMARY

An inventory zone, an inventory management system and an inventory management method for preparing and picking goods are provided according to the present disclosure, which realize the balance of the picking efficiency and the storage efficiency of the warehouse.

In a first aspect, an inventory zone for preparing and picking goods is provided according to embodiments of the present disclosure, which includes multiple high shelves and multiple picking shelves, wherein
   any high shelf of the multiple high shelves includes at least one plate, the at least one plate divides the high shelf into at least two layers;
   a picking shelf is placed at a bottom layer of at least one high shelf of the multiple high shelves, and at least one storage container is placed at each of the layers other than the bottom layer where the picking shelf is placed; and
   the picking shelf contains inventory items available for picking, and the storage container contains inventory items for replenishment of the picking shelf.

In a second aspect, an inventory management system for preparing and picking goods are provided according to the embodiments of the present disclosure, which includes a control server, a robot, an access device, a workstation, and an inventory zone for preparing and picking goods, wherein the access device and the robot respectively communicate with the control server, the inventory zone includes multiple high shelves and multiple picking shelves, any high shelf of the multiple high shelves includes at least one plate, the at least one plate divides the high shelf into at least two layers, a picking shelf is placed on a bottom layer of at least one of the multiple high shelves, at least one storage container is placed on each of layers other than the bottom layer where the picking shelf is placed, the storage container contains inventory items for replenishment of the picking shelf; the picking shelf contains inventory items available for picking; wherein
   the control server is configured to determine, in response to an item replenishment request, a target picking shelf where the inventory item to be replenished is located, a first robot for transporting the target picking shelf, a target storage container for replenishment of the target picking shelf, a target high shelf for storing the target storage container, a first access device for taking out the target storage container, and a target workstation for replenishment operations; and is configured to plan traveling paths for the first robot and the first access device; and configured to send a control instruction to the first robot and the first access device;
   the first robot is configured to travel, in response to the control instruction, to the high shelf where the target picking shelf is located according to the planned traveling path, and to identify the target picking shelf from the bottom layer of the high shelf and transport the target picking shelf to the target workstation; and the first access device is configured to travel, in response to the control instruction, to the target high shelf according to the planned traveling path, and to take out the target storage container from the target high shelf and transport the target storage container to the target workstation.

In a third aspect, an inventory management method for preparing and picking goods is provided according to the embodiments of the present disclosure, which includes:

determining by a control server, in response to an item replenishment request, a target picking shelf to be replenished, a first robot for transporting the target picking shelf, a target storage container for replenishment of the target picking shelf, a target high shelf for storing the target storage container, a first access device for taking out the target storage container, and a target workstation for replenishment operations; planning traveling paths for the first robot and the first access device; and sending a first control instruction to the first robot and the first access device; wherein the target high shelf and the target picking shelf are located in an inventory zone for preparing and picking goods, the inventory zone includes multiple high shelves and multiple picking shelves, any high shelf of the multiple high shelves includes at least one plate, the at least one plate divides the high shelf into at least two layers, a picking shelf is placed at a bottom layer of at least one of the multiple high shelves, at least one storage container is placed at each of layers other than the bottom layer where the picking shelf is placed, the storage container contains inventory items for replenishment of the picking shelf, and the picking shelf contains inventory items available for picking;

instructing, in response to the first control instruction, the first robot to travel to the high shelf where the target picking shelf is located according to the planned traveling path, and to identify the target picking shelf from the bottom layer of the high shelf and transport the target picking shelf to the target workstation; and instructing, in response to the first control instruction, the first access device to travel to the target high shelf according to the planned traveling path, and to take out the target storage container from the target high shelf and transport the target storage container to the target workstation.

Further, the picking shelf includes at least one plate, the at least one plate divides the picking shelf into at least two layers, and at least one picking container is placed on each layer of the picking shelf, and the picking container contains inventory items available for picking. The method further includes:

determining by the control server, in response to the item replenishment request, a target picking container where the inventory item to be replenished is located and the picking shelf where the target picking container is located, the first robot for transporting the target picking container; planning the traveling path for the first robot; and sending the first control instruction to the first robot; and instructing, in response to the first control instruction, the first robot to travel to the picking shelf where the target picking container is located according to the planned traveling path, and to identify the target picking container from the picking shelf and transport the target picking container to the target workstation.

In a fourth aspect, another inventory management method for preparing and picking goods is provided according to the embodiments of the present disclosure, which includes:

determining, in response to an item replenishment request, a target picking shelf where the inventory item to be replenished is located, a first robot for transporting the target picking shelf, a target storage container for replenishment of the target picking shelf, a target high shelf for storing the target storage container, a first access device for taking out the target storage container, and a target workstation for replenishment operations; planning traveling paths for the first robot and the first access device; and sending a first control instruction to the first robot and the first access device; wherein the target high shelf and the target picking shelf are located in an inventory zone for preparing and picking goods, the inventory zone includes multiple high shelves and multiple picking shelves, any high shelf of the multiple high shelves includes at least one plate, the at least one plate divides the high shelf into at least two layers, a picking shelf is placed at a bottom layer of at least one of the multiple high shelves, at least one storage container is placed at each of layers other than the bottom layer where the picking shelf is placed, the storage container contains inventory items for replenishment of the picking shelf, and the picking shelf contains inventory items available for picking; wherein the first control instruction is for instructing the first robot to travel to the high shelf where the target picking shelf is located according to the planned traveling path, and to identify the target picking shelf from the bottom layer of the high shelf and transport the target picking shelf to the target workstation; and the first control instruction is further for instructing the first access device to travel to the target high shelf according to the planned traveling path, and to take out the target storage container from the target high shelf and transport the target storage container to the target workstation.

The embodiments of the present disclosure provide an inventory zone, an inventory management system and an inventory management method for preparing and picking goods. An inventory zone for preparing and picking goods is formed by stacking the conventional stocking zones and picking zones in physical space, and the existing area of the warehouse is fully utilized, which ensures that the warehouse can store a large number of items and the number of workstations is not affected. Besides, in the inventory zone, under the cooperation of the control server, the robot and the access device, the operation for the high shelf and the operation for the picking shelf do not affect each other in physical space and are performed orderly, which in turn realizes the balance of the picking efficiency and the storage efficiency.

BRIEF DESCRIPTION OF THE DRAWINGS

In order to describe technical solutions of exemplary embodiments of the present disclosure more clearly, drawings for the embodiments of the present disclosure are introduced simply as follows. Apparently, the drawings to be described are only drawings of part of the embodiments to be described, rather than all drawings, and other drawings can be obtained based on these drawings by those skilled in the art without any creative efforts.

FIG. 1C is a schematic structural diagram of an access device according to an embodiment of the present disclosure;

FIG. 3 is a schematic diagram showing the working process of the inventory management system for preparing and picking goods according to a second embodiment of the present disclosure;

FIG. 4A to 4C are schematic diagrams showing the working process of the inventory management system for preparing and picking goods according to a third embodiment of the present disclosure;

FIG. 9 is a flow chart of a method for automatic replenishment provided by a second embodiment of the present disclosure;

FIG. 10 is a flow chart of a method for automatic replenishment provided by a third embodiment of the present disclosure.

DETAILED DESCRIPTION OF THE EMBODIMENTS

Figure 1A:
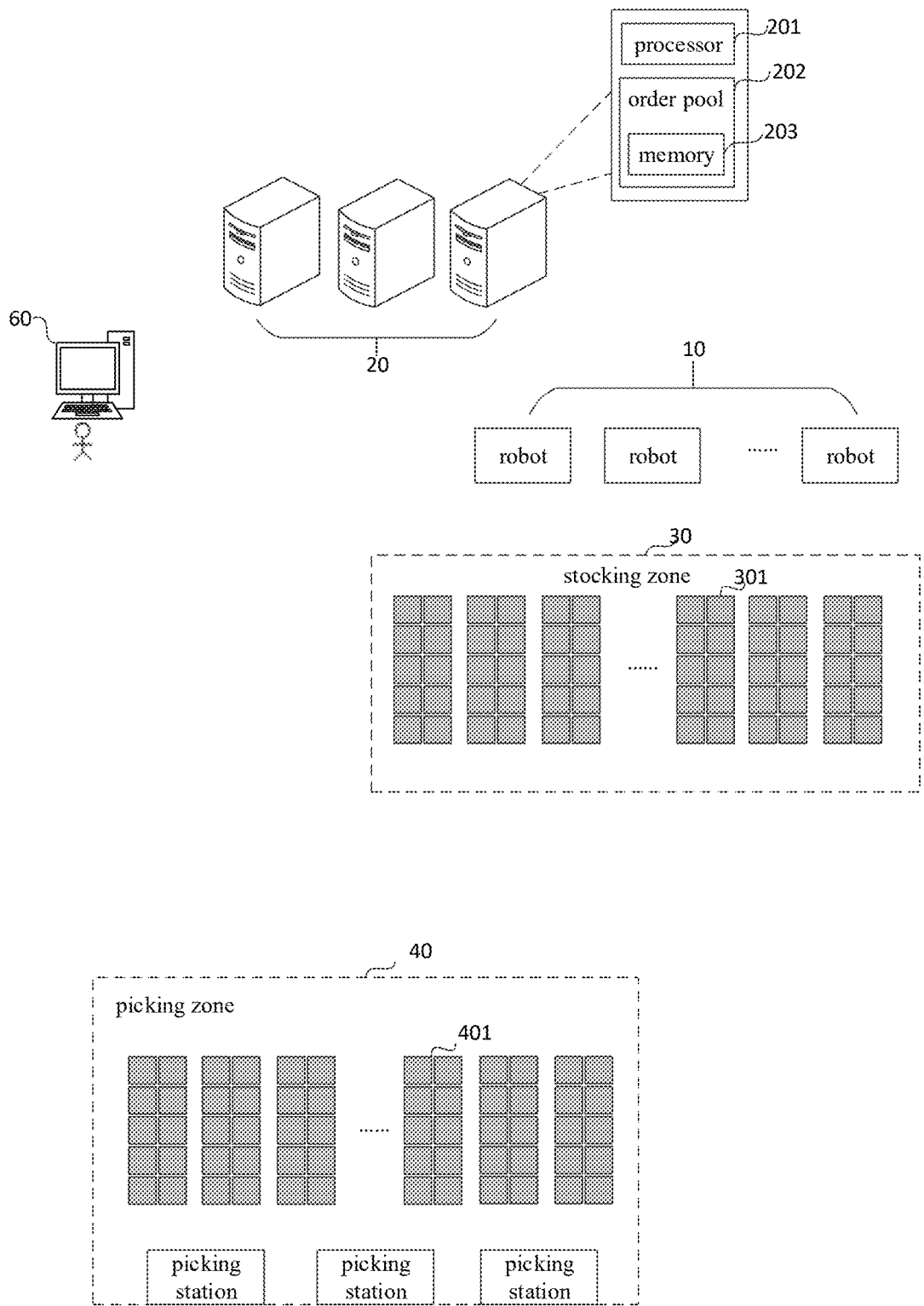
FIG. 1A is a schematic structural diagram of an inventory management system for preparing and picking goods according to an embodiment of the present disclosure.

Hereinafter, the present disclosure will be described in detail in conjunction with drawings and embodiments. It will be appreciated that the specific embodiments described herein are merely for describing the present disclosure, rather than limiting the present disclosure. It should be further noted that, for ease of description, only part of the structures rather than all associated with the present disclosure are shown in the drawings.

In order to better understand the technical solutions of the embodiments of the present disclosure, an inventory management system is described in detail, and reference can be made to FIG. 1A for the structure of the system. The system includes: an access device 1101, a robot 1102, a control server 120, a stocking zone 130, and a picking zone 140. The stocking zone 130 is provided with multiple shelves 1301 (for example, in order to improve the storage efficiency of a warehouse, the shelf may be a high shelf, and in the following description, the shelf arranged in the stocking zone 130 is described as the high shelf 1301 by way of example). Various bulk inventory items (such as a whole box of cola) that can be replenished to the picking zone are stored on the high shelf 1301. The picking zone 140 is also provided with multiple shelves 1401 (these shelves are used to store inventory items to be picked, so in the following description, the picking zone 140 is provided with multiple picking shelves 1401 by way of example, and the picking shelf 1401 may be a normal shelf or a tray shelf). Inventory items to be picked are placed on the picking shelf 1401, and when responding to an order task, these items can be picked into an order container, and one order container can be associated with at least one order. Generally, multiple workstations 1402 are provided on one side of the picking zone 140. In the picking scenario, the workstation 1402 may also be referred to as a picking station. In the replenishment scenario, the workstation 1402 may also be referred to as a replenishment station. As an implementation, the picking station and the replenishment station may share one workstation.

The control server 120 performs wireless communication with the access device 1101 and the robot 1102 respectively, the operator can operate the control server 120 through a console 160, and the access device 1101 and the robot 1102 perform respective tasks under the control of the control server 120. For example, the control server 120 plans movement paths for the access device 1101 and the robot 1102 according to the task, the access device 1101 travels along the vacant space (part of the passage of the access device 1101) in the high shelf array formed by the high shelves 1301 according to the movement path, and the robot 1102 travels along the vacant space (part of the passage of the robot 1102) in the picking shelf array formed by the picking shelves 1401 according to the movement path.

In order to facilitate the planning of movement paths for the access device 1101 and the robot 1102, a working region (the working region includes at least the region where the stocking zone 130 and the picking zone 140 are located) of the access device 1101 and the robot 1102 is divided into multiple sub-regions (that is, cells) in advance, and the access device 1101 and the robot 1102 move cell by cell to form a movement track.

The robot 1102 may be a robot for transporting the picking shelf 1401 of the picking zone 140. In an example, referring to FIG. 1B, the robot 1102 may include a drive mechanism 111 through which the robot 1102 can move in the working space. The robot 1102 may further include a lifting mechanism 112 for the picking shelf 1401, the robot 1102 can move to below the picking shelf 1401, and the robot 1102 can lift the picking shelf 1401 by means of the lifting mechanism 112 and transport the picking shelf 1401 to the workstation 1402. When the lifting mechanism 112 rises, the entire picking shelf 1401 is lifted from the ground, allowing the robot 1102 to transport the picking shelf 1401. When the lifting mechanism 112 descends, the picking shelf 1401 is laid on the ground. When the robot 1102 lifts the picking shelf 1401, a target identification component 113 on the robot 1102 can effectively identify the picking shelf 1401.

In addition to this, if it is based on visual navigation, the robot 1102 may further include a navigation identification component (not shown in FIG. 1B) for identifying a navigation mark (such as a quick response code) laid on the ground. Apparently, the robot 1102 may further include a control module that controls the entire robot to achieve motion, navigation, and the like (not shown in FIG. 1B). In an example, the robot 1102 includes at least two cameras upward and downward. The robot 1102 can travel forward according to the quick response code (or other ground identification marks) captured by the downward camera, and can travel to below the picking shelf 1401 as instructed by the control server 120 according to the route determined by the control server 120. The picking shelf 1401 can be identified according to the upward camera, so that a docking joint of the robot 1102 (connected with the lifting mechanism) docks with the picking shelf 1401 when the lifting mechanism lifts, and the picking shelf 1401 is lifted from the ground.

The access device 1101 can be a device (for example, a tray) for taking out storage containers from and store storage containers into the high shelf 1301 of the stocking zone 130. In an example, referring to FIG. 1C, the access device 1101 can be an unmanned forklift which may include a fork. A fork-extending direction of the forklift is parallel to a travel direction of the unmanned forklift to avoid excessively wide passages due to steering of the unmanned forklift when taking out and storing the storage container. Furthermore, the unmanned forklift may further include a controller for controlling the up and down parallel movements of the fork and a target identification component (not shown in FIG. 1C), and the like. Specifically, the unmanned forklift can travel to the target high shelf 1301 of the stocking zone 130, and determine the position of the target storage container to be acquired on the target high shelf 1301 based on the target identification component; then, the controller in the unmanned forklift adjusts the fork to the height of the target storage container and controls the fork to extend and go deep into the target storage container, thereby acquiring the target storage container, wherein the target storage container stores bulk inventory items that can be replenished to the picking zone.

The control server 120 is a software system run on a server with data storage and information processing capabilities, and can be connected with the access device, the robot, a hardware input system and other software systems via wireless or wired means. The control server 120 may include one or more servers, and have a centralized control architecture or a distributed computing architecture. The control server 120 has a processor 121 and a memory 122, and the memory 122 may have an order pool 123 therein.

In order to improve the picking efficiency, the picking zone can be replenished periodically. In a case that the system shown in FIG. 1A is operated in the replenishment scenario, the access device 1101 carries bulk inventory items from the stocking zone 130 to the workstation 1402 in the picking zone 140 (for example, the picking workstation and the replenishment workstation may share one workstation), and the robot 1102 carries the picking shelf 1401 or the picking container that requires replenishment also to the workstation 1402, allowing the operator (staff or other automated equipment) to put the bulk inventory items on the picking shelf 1401 or into the picking container. At least one picking container is placed on the picking shelf 1401, and the picking container contains inventory items available for picking. As an optional manner, goods compartments are provided on the picking shelf, and the inventory items may be placed directly in the goods compartments of the picking shelf 1401.

The system shown in FIG. 1A will be described by way of example. For a warehouse with a fixed area, if the types and the storage volume of items to be stored in the warehouse are increased, the stocking zone 130 needs to be expanded to improve the storage efficiency of the warehouse. Accordingly, the picking zone 140 will shrink, and the shrinking of the picking zone 140 will inevitably affect the number of workstations 1402 in the picking zone 140, resulting in a decrease in the picking efficiency. For example, for the replenishment scenario, the number of workstations 1402 is decreased, and the speed of replenishment is slow. As a result, the goods cannot be replenished in time, which in turn affects the picking efficiency.

On the contrary, once the picking zone 140 is enlarged, the stocking zone 130 is relatively compressed; although the picking efficiency of the picking zone is improved, the shrinking of the stocking zone 130 adversely affects the storage efficiency as well. That is, the related art cannot balance the picking efficiency and the storage efficiency of the warehouse.

Based on the existing storing and picking system, the present disclosure further optimizes the related art, realizing the balance of the picking efficiency and the storage efficiency of the warehouse. Based on this, the technical solutions of the embodiments of the present disclosure will be described below to solve this problem.

First Embodiment

Figure 2A:
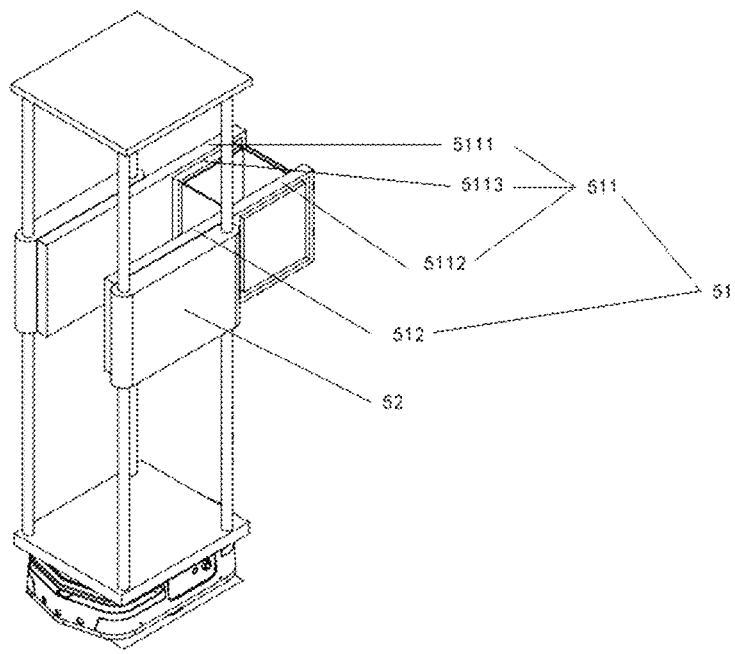
FIG. 2A is a schematic block diagram showing the structure of an inventory management system for preparing and picking goods according to a first embodiment of the present disclosure.

FIG. 2A is a schematic block diagram showing the structure of an inventory management system for preparing and picking goods according to a first embodiment of the present disclosure. This embodiment is applicable to the situation of how to balance the picking efficiency and the storage efficiency of the warehouse in a warehouse environment with a fixed and unexpandable area, and is particularly applicable to situations where items located in the inventory zone are operated under picking, replenishing or other operation scenarios. The inventory system can implement an inventory management method for preparing and picking goods according to any embodiment of the present disclosure. Referring to FIG. 2A, the system 200 specifically includes: a control server 201, a robot 202, an access device 203, a workstation 204, and an inventory zone 205 for preparing and picking goods.

The control server 201 may be a single-thread or multi-thread server, which can provide strategies for the picking and replenishment of inventory items, the allocation of the robot and the access device. The access device 203 and the robot 202 respectively communicate with the control server 201, and the workstation 204 may be a replenishment station, a picking station or an uploading station. Optionally, different operations correspond to different names of the workstation. In the present embodiment, the replenishment station, the picking station, and the uploading station may share a same workstation. The workstation serves as the replenishment station in the replenishment scenario, the picking station in the picking scenario, and the uploading station in the uploading scenario.

The inventory zone 205 includes multiple high shelves 206 and multiple picking shelves 207. Similar to the arrangement of the high shelves in the stocking zone of FIG. 1A, in this embodiment, multiple high shelves 206 can be placed in the inventory zone 205, every several high shelves of the respective shelves 206 can be arranged into a rectangular high shelf group, the high shelf groups can be arranged in an array, and the spacing in the array is the passageway for the access device or the robot.

In an optional embodiment of the present disclosure, any high shelf of the multiple high shelves 206 includes at least one plate 2061, the at least one plate 2061 divides the high shelf into at least two layers, a picking shelf 207 is placed at a bottom layer of at least one high shelf of the multiple high shelves 206, and at least one storage container 208 is placed at each of layers other than the bottom layer where the picking shelf 207 is placed. Specifically, the bottom layers of all the high shelves 206 in the inventory zone may all be placed with the picking shelf, and accordingly each of the layers other than the bottom layer of all high shelf 206 may be placed with storage container 208; or, the bottom layer of a portion of high shelves 206 of all the high shelves 206 in the inventory zone may be placed with picking shelf 207, and accordingly each of the remaining layers other than the bottom layer of this portion of high shelves 206 may be placed with storage container 208, and each of the remaining layers other than the bottom layer of the remaining high shelves 206 may be placed with storage container 208. The specific arrangement can be flexibly selected in conjunction with the actual scenarios to achieve a balance between the picking efficiency and the storage efficiency. The storage container 208 contains inventory items for replenishment of the picking shelf. The storage container 208 may, for example, be a tray, a material box, or a custom-made container suitable for storing corresponding inventory items. The picking shelf 207 contains inventory items available for picking. Optionally, the inventory items available for picking may be directly placed on the picking shelf 207, or may be placed in a picking container 209, and the picking container 209 is placed in the picking shelf 207. The picking container 209 may, for example, be a material box, a cardboard box, a circulation box, or a custom-made container suitable for storing corresponding inventory items.

Figure 2B:
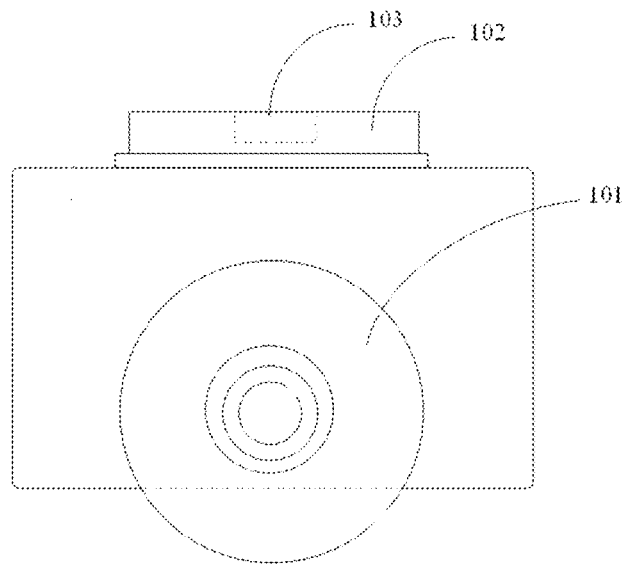
FIG. 2B is a schematic diagram of a picking shelf according to an embodiment of the present disclosure.

As an optional manner of the embodiment of the present disclosure, the picking shelf 207 may be a common picking shelf as shown in FIG. 2B, and includes at least one plate 2071, the at least one plate divides the picking shelf 207 into at least two layers, and at least one picking container 209 is placed on each layer of the picking shelf, and the picking container 209 contains inventory items available for picking therein. Besides, the inventory items may be placed directly in goods compartments of the picking shelf 207 (not shown in FIG. 2B).

A first readable mark 2072 as shown in FIG. 2B is provided at the bottom of the picking shelf 207, such as a quick response code. When the robot 202 has travelled to below the picking shelf 207, the quick response code is captured by the upward camera, and it is ensured that the robot 202 is located directly under the picking shelf 207, so as to ensure that the robot 202 can smoothly lift up and transport the picking shelf 207. Optionally, a second readable mark 2073 may be provided in the vicinity of a front surface of the picking container 209, such as a quick response code. If only the picking container 209 needs to be transported, the staff can read the quick response code 2073 on the picking container 209 through a scanning gun to ensure that the obtained picking container 209 is the needed; or, after the robot that specializes in transporting picking containers, such as a robot 202 with a grabbing function, travels to a front surface of the picking shelf 207, the quick response code 2073 on the picking container 209 is captured by the camera, so as to ensure that the picking container 209 can be accurately grasped. The picking shelf 207 may further include one or more support portions 2074. In a particular embodiment, the picking container 209 may be hung by a hook or rod in or on the picking shelf 207. The picking container 209 of the picking shelf 207 can be placed inside the picking shelf 207 or on an outer surface of the picking shelf 207 in any suitable manner.

In addition, the picking shelf 207 may be a tray shelf. In actual application scenarios, the tray shelf and the common picking shelf may both exist.

In an optional implement manner of the present embodiment, the high shelf 206 or the picking shelf 207 includes multiple plates stacked in the vertical direction. For the high shelf 206, one or more storage containers may be stored on each plate. For the picking shelf 207, one or more picking containers can be stored on each plate, or one or more inventory items can be stored on each plate.

Figure 1B:
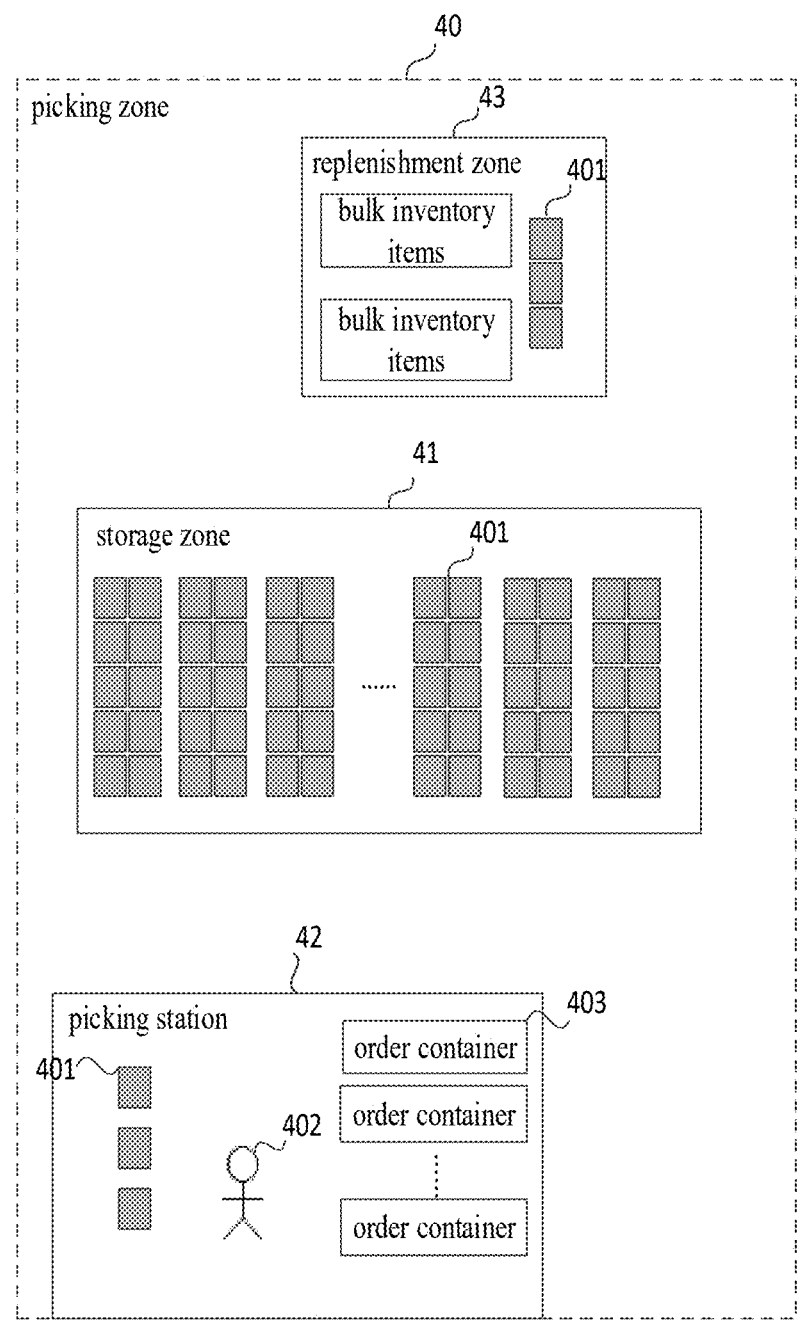
FIG. 1B is a schematic structural diagram of a robot according to an embodiment of the present disclosure.
Figure 2C:
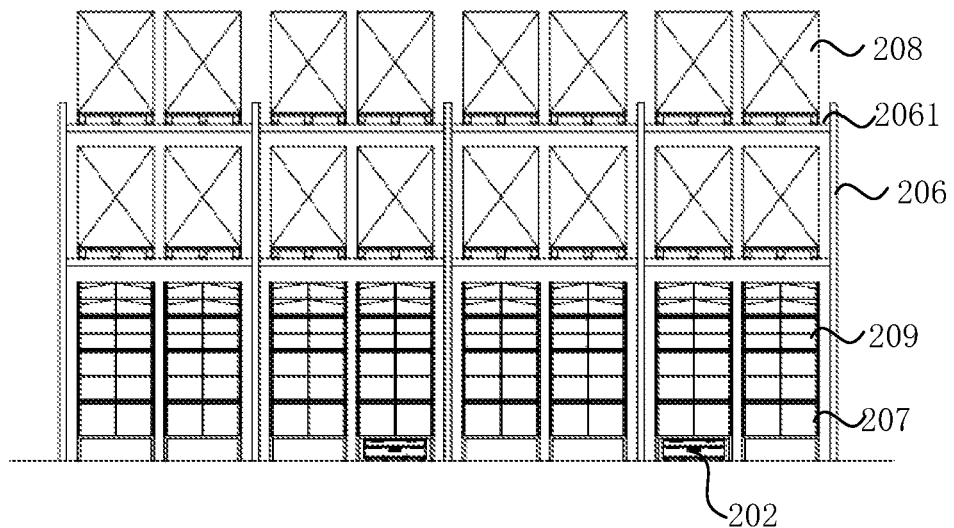
FIGS. 2C and 2D are front and side views of a high shelf according to the first embodiment of the present disclosure.
Figure 2D:
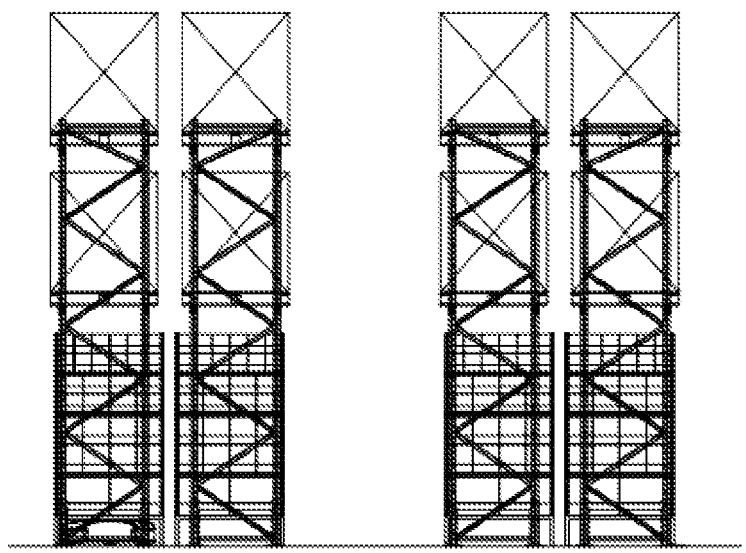

For example, referring to FIGS. 2C and 2D, four parallel high shelves 206 are provided, each high shelf 206 includes two layers of plates 2061, and the two plates 2061 divide the high shelf 206 into three layers. The picking shelf 207 is placed at the bottom layer of the high shelf 206, and a space that can accommodate the robot 202 of the structure shown in FIG. 1B is provided below the picking shelf 207, and the robot 202 can move to below the picking shelf 207, the picking shelf 207 can be lifted by a lifting mechanism and be transported to the workstation 204. The storage container 208 is placed on each of the two plates of the high shelf 206. The storage container 208 is a tray, and inventory items for replenishment of the picking shelf 207 are placed on the tray.

In the present embodiment, the access device 203 may be an unmanned smart forklift, and the smart forklift can adopt the structure shown in FIG. 1C. However, in order to narrow the passage width between the high shelves 206 as much as possible to allow the warehouse to accommodate more high shelves 206 and further to expand the storage capacity and the picking capacity of the warehouse, the access device is preferably an unmanned forklift for a narrow passage. The difference between the structure of the unmanned forklift for the narrow passage and the structure of the common smart forklift shown in FIG. 1C lies in that, the fork-extending direction of the unmanned forklift for the narrow passage is perpendicular to the traveling direction. The fork can be extended laterally to take out the storage containers 208 on the high shelves 206 on two sides of the passage.

Figure 2E:
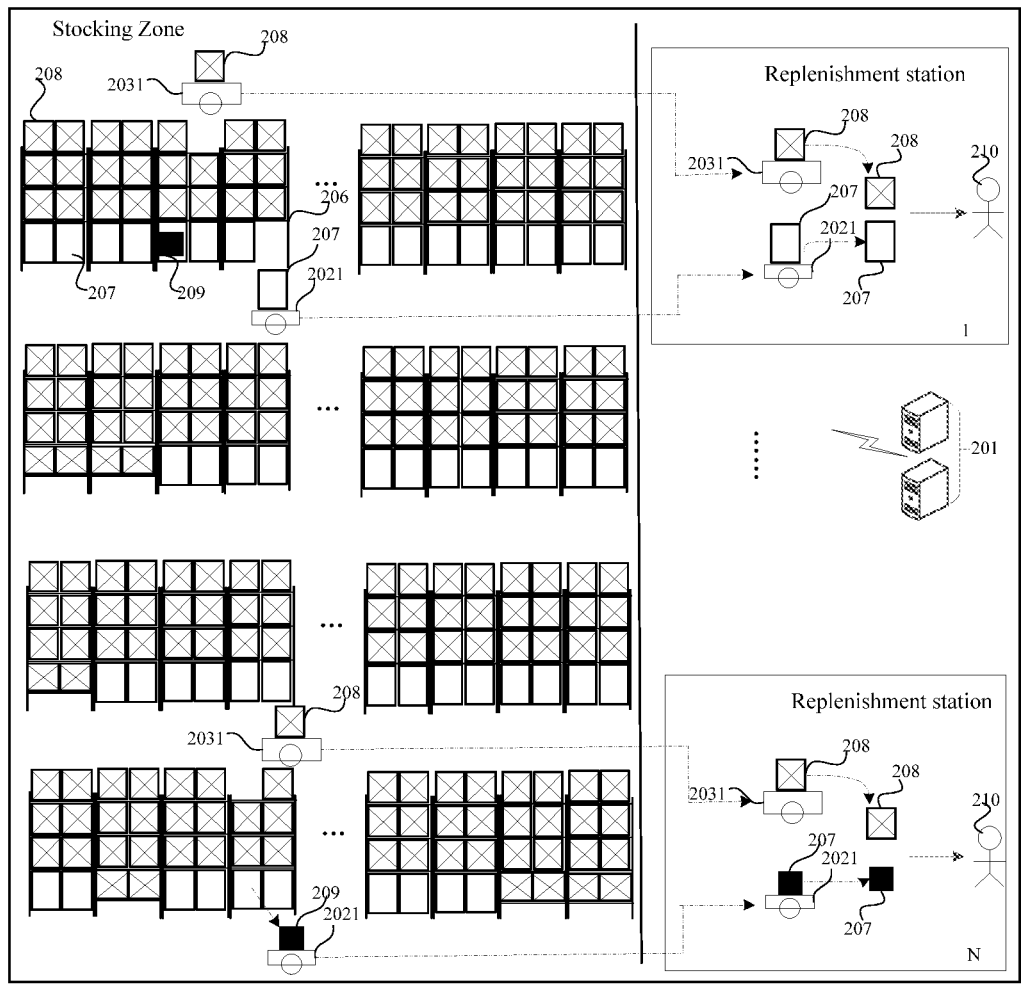
FIG. 2E is a schematic diagram showing the working process of the inventory management system for preparing and picking goods according to the first embodiment of the present disclosure.

Based on the above inventory system for preparing and picking goods, in this embodiment, the inventory system runs in the replenishment and picking scenarios by way of example to introduce how operations of preparing and picking goods are performed in physical space. However, the inventory system is not limited to these scenarios, and the inventory system can further be used in checking and uploading scenarios. First, operations under the replenishment scenario are described. FIG. 2E is a schematic diagram showing the working process of the inventory management system for preparing and picking goods according to the first embodiment of the present disclosure.

In the present embodiment, the workstation 204 is a replenishment station.

The control server 201 is configured to determine, in response to an item replenishment request, a target picking shelf 207 where the inventory item to be replenished is located or a target picking container 209 where the inventory item to be replenished is located and the picking shelf 207 where the target picking container 209 is located, to determine the first robot 2021 for transporting the target picking shelf 207 or the target picking container 209, the target storage container 208 for replenishment of the target picking shelf 207 or the target picking container 209, the target high shelf 206 for storing the target storage container 208, the first access device 2031 for taking out the target storage container 208, and the target replenishment station for replenishment operations, and is configured to plan traveling paths for the first robot 2021 and the first access device 2031, and is configured to send a control instruction to the first robot 2021 and the first access device 2031;

the first robot 2021 is configured to travel, in response to the control instruction, to the high shelf 206 where the target picking shelf 207 is located according to the planned traveling path, and to identify the target picking shelf 207 from the bottom layer of the high shelf 206 and transport the target picking shelf 207 to the target replenishment station; or the first robot 2021 is configured to travel to the picking shelf 207 where the target picking container 209 is located according to the planned traveling path, and to identify the target picking container 209 from the picking shelf 207 and transport the target picking container 209 to the target replenishment station; and the first access device 2031 is configured to travel, in response to the control instruction, to the target high shelf 206 according to the planned traveling path, and to take out the target storage container 208 from the target high shelf 206 and transport the target storage container 208 to the target replenishment station, so that the replenishment equipment or replenishment staff 210 in the target replenishment station obtain the inventory items from the target storage container 208 according to the replenishment request and place the inventory items on the target picking shelf 207 or into the target picking container 209.

In an embodiment of the present disclosure, the control server 201 may be configured to send a replenishment instruction to the access device 2031 when detecting that the first robot 2021 has transported the target picking shelf 207 or the target picking container 209 to the target replenishment station; the access device 2031 is configured to acquire, in response to the replenishment instruction, according to the instruction of the replenishment instruction, the inventory item from the target storage container 208 and place the inventory item on the target picking shelf 207 or into the target picking container 209; the control server 201 is further configured to send a transport instruction to the first robot 2021 after detecting that the access device 2031 has acquired the inventory item from the target storage container 208 and placed the inventory item on the target picking shelf 207 or into the target picking container 209; the first access device 2031 may be further configured to transport, in response to the transport instruction, the target picking container 209 carrying the inventory item from the target replenishment station to a corresponding area in the target high shelf 206 according to the transport instruction, thereby completing the automatic replenishment of the inventory item.

In the present embodiment, the item replenishment request may be a request issued by the upstream system to the control server 201 to replenish the inventory item during the daily picking operation, when the upstream system detects that a certain inventory item is out of stock in the picking shelf 207 stored at the bottom layer of the inventory zone 205; or the item replenishment request may be a request sent to the control server 201 by a staff at the workstation through a communication device held by himself, when the staff determines that a certain inventory item is out of stock in the picking shelf 207 stored at the bottom layer of the inventory zone 205.

For example, the process of the control server 201 determining that the item to be picked needs to be replenished includes: the control server 201 calculates the inventory amount of the items to be picked in the inventory zone 205, and if the inventory amount is less than or equal to a preset security inventory threshold, it is determined that the item needs to be replenished.

In this embodiment, the inventory amount refers to the number of items to be currently picked; the security inventory threshold refers to a range of the number of items which can meet the required amount in the daily picking operation process. The security inventory threshold may be for one day, and may also be for one week or one month, etc. The security inventory threshold may include an upper threshold and a lower threshold. Different items may have different or same security inventory thresholds. In a feasible embodiment, the security inventory threshold can be determined based on the popularity and the popularity level of the goods in a certain period. For example, a down jacket is not so popular in summer, and a lower security inventory threshold can be set for the down jacket, while a T-shirt is more popular in summer, and a higher security inventory threshold can be set for the T-shirt.

Specifically, if the control server 201 detects that a certain item to be picked is out of stock, that is, the inventory amount of the item is less than or equal to the lower threshold of the set security inventory threshold of the item, a replenishment task for the item that needs replenishment is generated. Optionally, the control server 201 is further configured to determine the pre-replenishment amount of the item according to the difference between the security inventory threshold and the inventory amount, and determine at least one of the actual replenishment amount of the item and the picking shelf 207 according to the pre-replenishment amount and the storage specification of the item to be picked, and generate the replenishment task for the item according to the actual replenishment amount of the item.

The pre-replenishment amount refers to the number of the item to be picked that is out of stock, and can be obtained by subtracting the inventory amount of the item from the security inventory upper threshold of the item. The storage specification refers to a maximum storage space or a maximum storage amount of a certain item that can be accommodated by the picking shelf. If the storage container is a storage box, the item is clothes, and the storage specification refers to the number of clothes when the entire box is filled with the clothes, for example, ten pieces for one box. Different items may have different or same storage specifications. In a feasible solution, the items stored in the inventory zone 205 are stored in accordance with the specification, that is, a whole box, of the items. The actual replenishment amount of the item is an integral multiple of the storage specification of the item in the inventory zone 205, and the actual replenishment amount of the item is equal to or greater than the pre-replenishment amount of the item. As an alternative, the items stored in the inventory zone 205 are stored in accordance with the specification, that is, a whole box, of the items. The pre-replenishment amount may be an integral multiple of the storage specification of the picking shelf, or less than the storage specification of the picking shelf. The type of picking shelf is determined according to the pre-replenishment amount and the storage specification. For example, if the pre-replenishment amount is an integral multiple of the storage specification of the picking shelf, the picking shelf can be a tray shelf, which is convenient to accommodate a whole tray of items. If the pre-replenishment amount is less than the storage specification of the picking shelf, the picking shelf can be a partition plate shelf, which is convenient to accommodate items parted from a whole tray. The structures of the tray shelf and the partition plate shelf will be described later.

Optionally, the item replenishment request may include the name and replenishment amount of the inventory item that needs to be replenished, the storage position of the inventory item on the high shelf 206 in the inventory zone 205, and, the picking shelf 207 that needs to be replenished or the picking container 209 on this picking shelf 207.

Figure 2F:
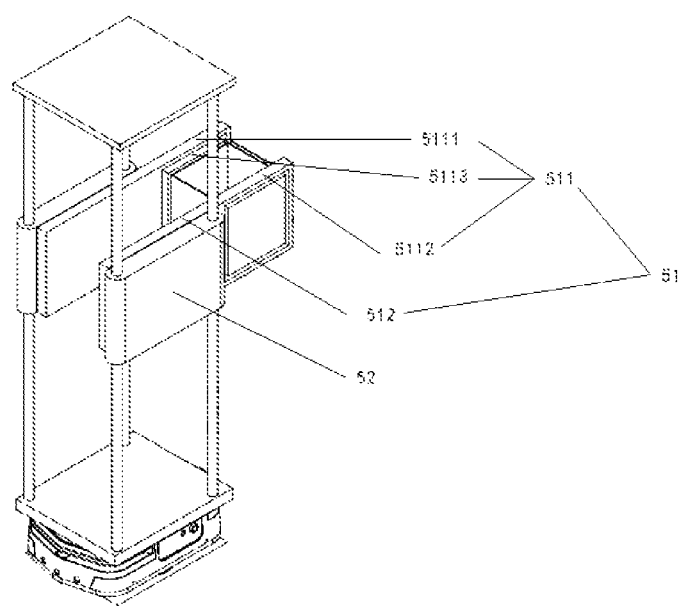
FIG. 2F is a schematic structural diagram of a robot with a grabbing device applied to an embodiment of the present disclosure.

In this embodiment, the robot for transporting the picking shelf 207 has a different structure as compared with the robot for transporting the picking container 209. A robot having the robot structure shown in FIG. 1B can be selected to transport the picking shelf 207, and a robot having a grabbing device as shown in FIG. 2F can be selected to transport the picking container 209. Specifically, as shown in FIG. 2F, the lifting mechanism in the robot shown in FIG. 1B can be removed, and a grabbing device for grabbing the material box can be added. The grabbing device includes a telescopic assembly 51, and the telescopic assembly 51 is configured to grab the picking container 209 from the picking shelf 207. The grabbing device may include a lifting assembly 52, the lifting assembly 52 can lift and/or descend the telescopic assembly 51 to a preset height, the robot 202 can therefore adjust the height of the grabbing device, so that the grabbing device can grab the picking container 209, or the grabbing device can place the picking container 209 on the picking shelf 207. Optionally, the telescopic assembly 51 in the grabbing device may include a clamping portion 511 and a sliding portion 512. The clamping portion 511 can grab the picking container 209, such as the material box, from the picking shelf 207 by a clamping manner. The clamping portion 511 is slidingly connected with the sliding portion 512, and the clamping portion 511 can slide in the depth direction of the shelf plate through the sliding portion 512. The clamping portion 511 may include a first gripper 5111 and a second gripper 5112 which are correspondingly arranged on the left and right sides of the separation layer. The first gripper and the second gripper may have a plate-like structure, as shown in FIG. 2F, or other structures such as a rod-shaped structure. The clamping portion 511 may further include a non-slip pad 5113 arranged on inner sides of the first griper 5111 and the second gripper 5112. The non-slip pad 5113 is foldable, and the non-slip pad 5113 is folded when the clamping portion 511 does not grab the picking container, and the non-slip pad 5113 is stretched out when the clamping portion 511 grabs the picking container. The vertical height of the first gripper 5111 and the second gripper 5112 match the height of the plate of the shelf, such that the first gripper 5111 and the second gripper 5112 can go deep into the plate of the picking shelf 207 to grab the picking container on the plate.

The control instruction refers to an instruction issued by the control server 201 to the first robot 2021 and the first access device 2031 to transport the required item. Optionally, the control instruction issued to the first robot 2021 may include a traveling path, an identifier of the target picking shelf 207 or an identifier of the target picking container 209, and an identifier of the target replenishment station, and may further include an identifier of the high shelf 206 where the target picking shelf 207 is located, or the identifier of the picking shelf 207 where the target picking container 209 is located, and the identifier of the high shelf 206 where the picking shelf 207 is located, etc. In the control instruction issued to the first access device 2031 may include a traveling path, an identifier of the target storage container 208, an identifier of the target high shelf 206 where the target storage container 208 is located, and an identifier of the target replenishment station.

By way of example, the identifier of the picking shelf 207, the identifier of the high shelf 206, the identifier of the storage container 208, and the identifier of the picking container 209 all are unique, may be quick response codes or other graphical marks similar to the quick response code, or may be RFID or other electronic tags similar to RFID with wireless transmission function. The robot 202 or the access device 203 can identify the target through the identifier. For example, the robot 202 can identify the picking shelf 207 through the identifier on the picking shelf 207.

Further, it should be noted that the target high shelf 206 where the target storage container 208 is stored and the high shelf 206 where the target picking shelf 207 storing the inventory item to be replenished is located may be the same one or not. Accordingly, the high shelf 206 where the picking shelf 207 storing the target picking container 209 is located and the target high shelf 206 where the target storage container 208 is stored may be the same one or not. In the actual replenishment, in a case that multiple target storage containers 208 can serve for the replenishment of the target picking shelf 207 or the target picking container 209, the target storage container 208 can be selected based on the principle of proximity and the replenishment amount, and then the target high shelf 206 for storing the target storage container 208 can be determined.

By way of example, the following is described with the target replenishment station being the first and Nth replenishment stations. Apparently, in the present embodiment, the target replenishment station is not limited to the first and Nth workstations, and other workstations are also applicable. Referring to FIG. 2E, in order to cover the case that the first robot 2021 transports the target picking shelf 207 and the case that the first robot 2021 transports the target picking container 209, the following is described with the first robot 2021 transporting the target picking shelf 207 in the first workstation and the first robot 2021 transporting the target picking container 209 in the Nth workstation as an example. In the actual situation, one robot can only transport one of the target picking shelf 207 and the target picking container 209 at one moment. The specific operation process is as follows: when the upstream system determines that the picking shelf 207 placed at the bottom layer of the inventory zone 205 needs to be replenished, the item replenishment request can be issued to the control server 201; after receiving the item replenishment request issued by the upstream system, the control server 201 determines, in response to the item replenishment request, the target picking shelf 207 where the inventory item to be replenished is located or the target picking container 209 where the inventory item to be replenished is located and the picking shelf 207 where the target picking container 209 is located, according to the item replenishment request, determines the high shelf 206 where the target picking shelf 207 is located or the high shelf 206 where the picking shelf 207 storing the target picking container 209 is located, the target storage container 208 for replenishment of the target picking shelf 207 or the target picking container 209, and the target high shelf 206 for storing the target storage container 208; and determines the target replenishment station for the implementation of this replenishment operation according to the status of the operation task of each replenishment station; and then, based on the shortest path principle, the working status of each robot, and the working status of each access device, the control server 201 determines the first robot 2021 for transporting the target picking shelf 207 or the target picking container 209, and the first access device 2031 for taking out the target storage container 208; plans traveling paths for the first robot 2021 and the first access device 2031; and sends the control instruction to the first robot 2021 and the first access device 2031.

According to the autonomous navigation function, the identifier of the high shelf 206 where the target picking shelf 207 is located and the traveling path included in the control instruction, the first robot 2021 travels, in response to the control instruction, to the high shelf 206 where the target picking shelf 207 is located, and identifies the target picking shelf 207 according to the identifier of the target picking shelf 207 in the control instruction; then obtains the target picking shelf 207 from the bottom layer of the high shelf 206 by the lifting mechanism and transports the target picking shelf 207 to the target replenishment station. Or, according to the autonomous navigation function, the identifier of the high shelf 206 where the picking shelf 207 storing the target picking container 209 is located and the traveling path included in the control instruction, the first robot 2021 travels to the high shelf 206 where the picking shelf 207 storing the target picking container 209 is located, and identifies the picking shelf 207 according to the identifier of the picking shelf 207 where the target picking container 209 is located in the control instruction, and then grabs the target picking container 209 from the picking shelf 207 with the grabbing device arranged on the robot and transports the target picking container 209 to the target replenishment station.

In the meantime, according to the autonomous navigation function, the identifier of the target high shelf 206 where the target storage container 208 is located and the traveling path included in the control instruction, the first access device 2031 travels, in response to the control instruction, to the target high shelf 206; then takes out, according to the identifier of the target storage container 208, the target storage container 208 from the target high shelf 206 and transports the target storage container 208 to the target replenishment station. If the first access device 2031 is a first unmanned forklift, the first unmanned forklift determines where the target storage container 208 is located on the target high shelf 206 according to the identifier of the target storage container 208 after traveling to the target high shelf 206, then adjusts the fork to the height where the target storage container 208 is located, and forks the target storage container 208 from the target high shelf 206 and transports the target storage container 208 to the target replenishment station.

Further, the replenishment equipment or the replenishment staff 210 in the target replenishment station can take out the item from the target storage container 208 and place the target storage container 208 on the target picking shelf 207 or into the target picking container 209 in accordance with the replenishment request, so as to achieve the item replenishment.

It should be noted that, with the target picking shelf 207 being transported by the first robot 2021 as an example, during this process, the first robot 2021 can place the target picking shelf 207 at a designated position of the target replenishment station after transporting the target picking shelf 207 to the target replenishment station, so that the replenishment equipment or replenishment staff 210 in the target replenishment station can manipulate the target picking shelf 207; the first robot 2021 can then continue to respond to other control instruction sent by the control server 201 to remove the correlation between the first robot 2021 and the target picking shelf 207. The first robot 2021 may always keep docking with the target picking shelf 207, that is, the target picking shelf 207 always keeps the correlation with the first robot 2021. That is to say, during the process of manipulating the target picking shelf 207, the first robot 2021 always waits at a certain position for the operation to the target picking shelf 207 to be completed; or, the target picking shelf 207 is always on the first robot 2021, and the replenishment equipment or replenishment staff 210 directly manipulates the target picking shelf 207 on the first robot 2021.

Correspondingly, during this process, the first access device 2031 can place the target storage container 208 at a designated position of the target replenishment station after transporting the target storage container 208 to the target replenishment station, so that the replenishment equipment or replenishment staff 210 in the target replenishment station can manipulate the target storage container 208; the first access device 2031 can then continue to respond to other control instruction sent by the control server 201 to remove the correlation between the first access device 2031 and the target storage container 208, or, the first access device 2031 may always keep docking with the target storage container 208, that is, the target storage container 208 always keeps the correlation with the first access device 2031.

By way of example, the first robot 2021 may be configured to always keep docking with the target picking shelf 207 or the target picking container 209 during the process that the target picking shelf 207 or the target picking container 209 is manipulated; or, the first robot 2021 may be configured to wait for and execute other control instructions after placing the target picking shelf 207 or the target picking container 209 at the designated position of the target replenishment station (that is, the working position of the replenishment equipment or replenishment staff 210). Accordingly, the first access device 2031 may be configured to always keep docking with the target storage container 208 during the process of manipulating the target storage container 208; or, the first access device 2031 may be configured to wait for and execute other control instructions after placing the target storage container 208 at the designated position of the target replenishment station.

If the first robot 2021 is configured to always keep docking with the target picking shelf 207 or the target picking container 209 during the process of manipulating the target picking shelf 207 or the target picking container 209. In this embodiment, as for the process of transporting to the target replenishment station, reference can be made to FIG. 2G. The specific operation process of transporting from the target replenishment station to the inventory zone is as follows: when the control server 201 detects that the operation to the target picking shelf 207 or the target picking container 209 is finished, or the control server 201 receives the replenishment completion request sent by the replenishment staff, the control server 201 sends the control instruction to the first robot 2021; the first control robot 2021 transports the target picking shelf 207 from the target replenishment station to the inventory zone 205 in accordance with the control instruction. To be specific, the target picking shelf 207 may be placed in the original position, such as the case of the first replenishment station shown in FIG. 2F. It is also feasible that the target picking shelf 207 is placed on the bottom layer of other vacant high shelf 206 with the bottom layer for storing the picking shelf 206 in the inventory zone 205. Or, the first robot 2021 transports the target picking container 209 from the target replenishment station to the inventory zone 205 in accordance with the control instruction. To be specific, the target picking container 209 may be placed at the original position, that is, the target picking container is transported to the high shelf 206 where the picking shelf 207 storing the target picking container is located, and the target picking container 209 is placed on this picking shelf 207, such as the case of the Nth replenishment station shown in FIG. 2F. It is also feasible that the target picking container 209 is placed on other picking shelf 207.

Figure 2G:
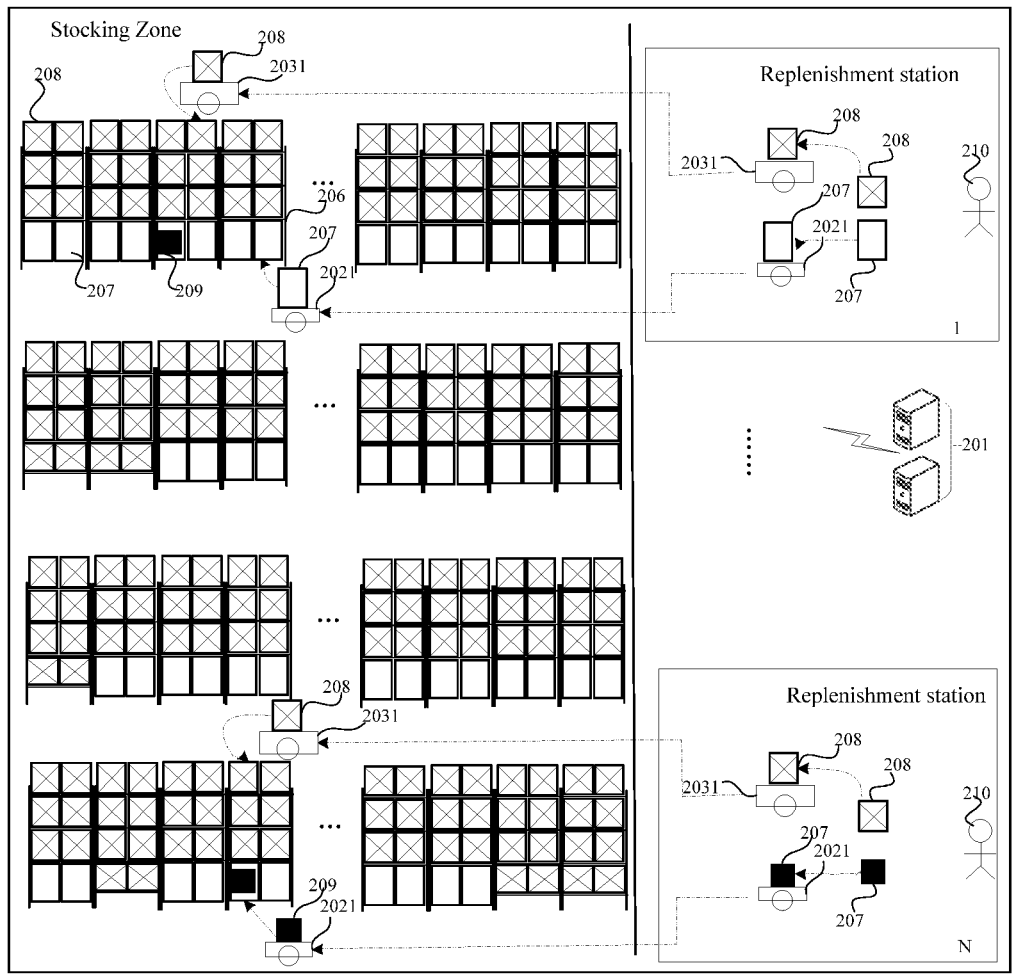
FIGS. 2G and 2H are schematic diagrams showing the working process of another inventory management system for preparing and picking goods according to the first embodiment of the present disclosure.

Correspondingly, if the first access device 2031 is configured to always keep docking with the target storage container 208 during the process of manipulating the target storage container 208. Referring to FIG. 2G, by way of example, when the control server 201 detects that the operation to the target storage container 208 is finished, or the control server 201 receives the replenishment completion request sent by the replenishment staff, the control server 201 sends the control instruction to the first access device 2031. The first access device 2031 transports the target storage container 208 from the target replenishment station to the inventory zone in response to the control instruction. To be specific, the target storage container 208 may be placed in the original position, that is, the target storage container 208 is transported to the target high shelf 206 where the target storage container 208 is located, and the target storage container 208 is placed on the target high shelf 206. If the first access device 2031 is the first unmanned forklift, the unmanned forklift lifts the fork to the required height where the target storage container 208 needs to be placed on the target high shelf 206 after transporting the target storage container 208 from the target replenishment station to the target high shelf 206 where the target storage container 208 is located, and then places the target storage container 208 onto the target high shelf. Further, the first access device 2031 may also place the target storage container 208 onto other high shelf 206 (not shown in FIG. 2G).

In order to improve the work efficiency of the robot and the access device, in an optional implement manner of the embodiment of the present disclosure, the robot may further include a second robot 2022, and the second robot 2022 may have the same structure as the first robot 2021. The access device may further include a second access device 2032, and the second access device 2032 may have the same structure as the first access device 2031.

In an embodiment, the first robot 2021 waits for and executes other control instructions after placing the target picking shelf 207 or the target picking container 209 at the designated position of the target replenishment station, and the first access device 2031 waits for and executes other control instructions after placing the target storage container 208 at the designated position of the target replenishment station. By way of example, the control server 201 may be configured to determine, in response to the replenishment completion request, the second access device 2032 for storing the target storage container 208, and the second robot 2022 for transporting the target picking shelf 207 or the target picking container 208; plan traveling paths for the second robot 2022 and the second access device 2032; and send the control instruction to the second robot 2022 and the second access device 2032.

The second robot 2022 may be configured to obtain, in response to the control instruction, the target picking shelf 207 or the target picking container 209 from the target replenishment station according to the planned traveling path, and transport the target picking shelf 207 or the target picking container 209 to the inventory zone.

The second access device 2032 may be configured to obtain, in response to the control instruction, the target storage container 208 from the target replenishment station according to the planned traveling path, and transport the target storage container 208 to the inventory zone.

In this embodiment, the replenishment completion request may be an instruction sent by the replenishment staff or the upstream system to the control server, to inform the control server that this replenishment task has been completed, and that the target picking shelf and the target storage container, or, the target picking container and the target storage container, can be transported to the inventory zone. The replenishment completion request may also be an instruction which is issued when a detection device in the control server detects that the replenishment task has been completed.

Optionally, the second robot 2022 may place the target picking shelf 207 in the original position or place the target picking shelf 207 on the bottom layer of other vacant high shelf 206 with the bottom layer for storing the picking shelf 206 in the inventory zone 205; or, the second robot 2022 may place the target picking container 209 in the original position or place the target picking container 209 on other picking shelf 207. Accordingly, the second access device 2032 may place the target picking container 209 in the original position or onto other high shelf 206.

Figure 2H:
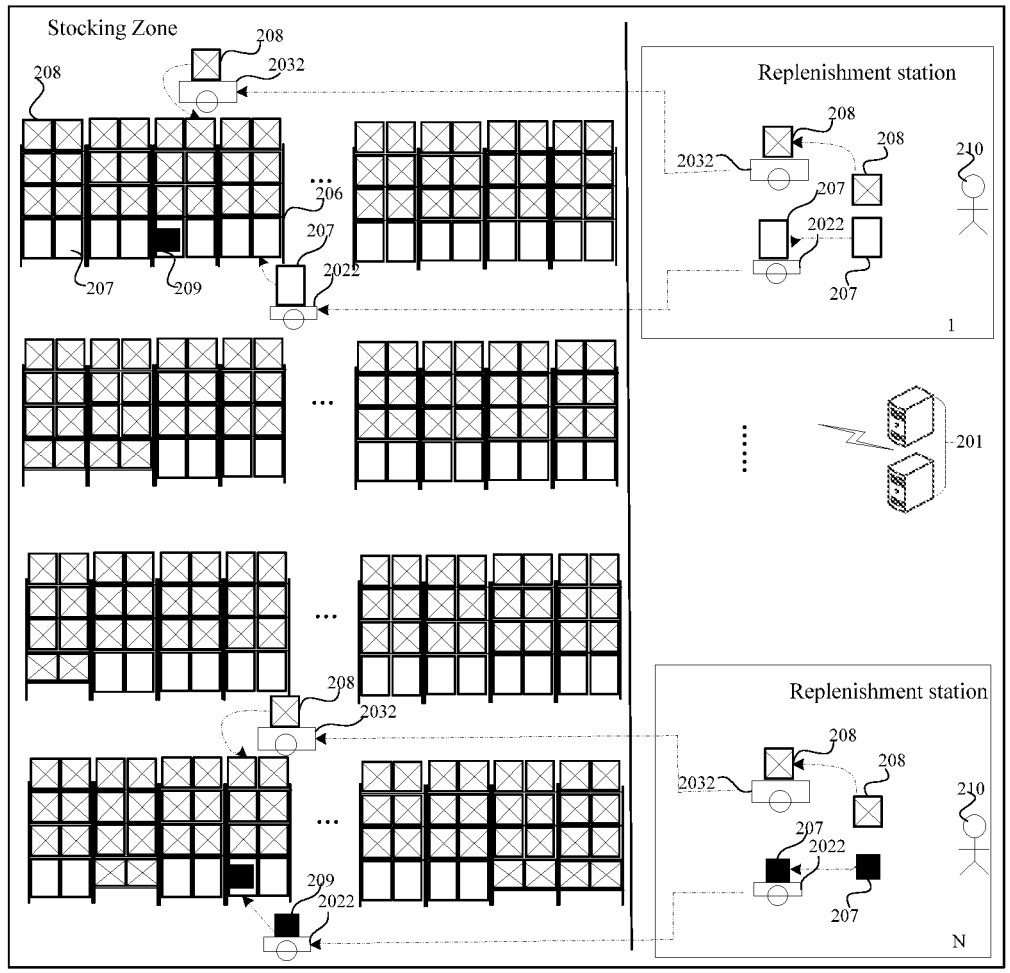

The following is described with the example that the second robot 2022 can place the target picking shelf 207 in the original position and the second access device 2032 can place the target picking container 209 in the original position. Specifically, referring to FIG. 2H, when the replenishment staff or the upstream system determines that the replenishment task has been completed, the replenishment completion request is sent to the control server 201. The control Server 201 responds to the replenishment completion request and determines, according to the replenishment completion request, the target high shelf 206 for storing the target storage container 208, the position where the target storage container 208 is located on the target high shelf 206, the position where the target picking shelf 207 or the target picking container 209 is stored, and the high shelf 206 where the target picking shelf 207 is placed or the high shelf 206 where the picking shelf 207 storing the target picking container 209 is located; Based on the shortest path principle, the working status of each robot, and the working status of each access device, the control server 201 then determines the second robot 2022 for transporting the target picking shelf 207 or the target picking container 209, and the second access device 2032 for storing the target storage container 208; plans traveling paths for the second robot 2022 and the second access device 2032; and sends the control instruction to the second robot 2022 and the second access device 2032.

According to the autonomous navigation function, the identifier of the high shelf 206 where the target picking shelf 207 is located and the traveling path included in the control instruction, the second robot 2022 travels, in response to the control instruction, to the high shelf 206 where the target picking shelf 207 is located; then determines the storage position of the target picking shelf 207 at the bottom layer of the high shelf 206, that is the location where the target picking shelf 207 is to be stored, and places the target picking shelf 207 in this position. Or, according to the autonomous navigation function, the identifier of the high shelf 206 where the picking shelf 206 storing the target picking container 209 is located and the traveling path included in the control instruction, the second robot 2022 travels to the high shelf 206, determines where the picking shelf 207 for storing the target picking container 209 is located on the bottom layer of the high shelf 206, determines where the target picking container 209 is to be placed on the picking shelf 207, and places the target picking container 209 in this position.

In the meantime, according to the autonomous navigation function, the identifier of the target high shelf 206 where the target storage container 208 is to be stored and the traveling path included in the control instruction, the second access device 2032 travels, in response to the control instruction, to the target high shelf 206; and then places the target storage container 208 in the target storage position on the target high shelf 206.

According to the technical solution provided by the embodiments of the present disclosure, an inventory zone for preparing and picking goods is formed by overlapping the conventional stocking zones and picking zones in physical space, and the existing area of the warehouse is fully utilized, which does not affect the number of workstations while ensuring that the warehouse can store a large number of items, and achieves a balance between the picking efficiency and the storage efficiency. Besides, in the inventory zone, under the cooperation of the control server, the robot and the access device, the operation for the high shelf and the operation for the picking shelf do not affect each other in physical space and are performed orderly.

Second Embodiment

FIG. 3 is a schematic diagram showing the working process of the inventory management system for preparing and picking goods according to a second embodiment of the present disclosure. Based on the above embodiment, how to achieve replenishment with the target storage container 208 being a target tray 2081 and the target picking shelf where the inventory item to be replenished is located being an empty tray shelf is described in detail.

The control server 201 is configured to determine, in response to the item replenishment request, the target picking shelf 207 where the inventory item to be replenished is located, the target tray 2081 for replenishment of the target picking shelf 207, the target high shelf 206 for storing the target tray 2081, and the first access device 2031 for taking out the target tray 2081; and is configured to plan the traveling path for the first access device 2031; and configured to send the control instruction to the first access device 2031;

the first access device 2031 can also be configured to travel, in response to the control instruction, to the target high shelf 206 according to the planned traveling path, and to take out the target tray 2081 from the target high shelf 206 and transport the target tray 2081 to the target picking shelf 207, and to place the target tray 2081 onto the target picking shelf 207.

With reference to FIG. 3, the specific operation process is as follows: when the upstream system determines that the picking shelf 207 placed at the bottom layer of the inventory zone 205 needs to be replenished, the item replenishment request can be issued to the control server 201; after receiving the item replenishment request issued by the upstream system, the control server 201 determines, in response to the item replenishment request, the target picking shelf 207 (which is an empty tray shelf herein) where the inventory item to be replenished is located, the high shelf 206 where the target picking shelf 207 is located, the target tray 2081 for replenishment of the target picking shelf 207, the target high shelf 206 for storing the target tray 2081; based on the shortest path principle, and the working status of each access device, the control server 201 then determines the first access device 2031 for taking out the target tray 2081, in the meantime, plans the traveling path for the first access device 2031; and sends the control instruction to the first access device 2031. According to the autonomous navigation function, the identifier of the target high shelf 206 where the target tray 2081 is located and the traveling path included in the control instruction, the first access device 2031 travels, in response to the control instruction, to the target high shelf 206; and then the target tray 2081 is taken out from the target high shelf 206 and transported to the high shelf 206 where the target picking shelf 207 is located, and the storage position where the target picking shelf 207 to be replenished is to be stored at the bottom layer of the high shelf 206 is determined, and then the target tray 2081 can be directly placed on the target picking shelf 207.

It should be noted that the target high shelf 206 where the target tray 2081 is stored and the high shelf 206 where the target picking shelf 207 storing the inventory item to be replenished is located may be the same one or not. In the actual replenishment, in a case that multiple target trays can serve for the replenishment of the target picking shelf 207 where the inventory goods to be replenished are located, the target tray 2081 can be selected based on the principle of proximity and the replenishment amount, and then the target high shelf 206 for storing the target tray 2081 can be determined.

According to the technical solution provided by the embodiments of the present disclosure, an inventory zone for preparing and picking goods is formed by overlapping the conventional stocking zones and picking zones in physical space, and the existing area of the warehouse is fully utilized, which does not affect the number of workstations while ensuring that the warehouse can store a large number of items, and achieves a balance between the picking efficiency and the storage efficiency. Besides, while not decreasing the storage efficiency of the warehouse, in the scenario that the storage container stored on the high shelf is the tray and the picking shelf to be replenished is the empty tray shelf, the replenishment by an entire tray can be realized through the cooperation of the control server and the access device in the inventory system, which improves the replenishment efficiency and further improves the picking efficiency.

Third Embodiment

FIG. 4A to 4C are schematic diagrams showing the working process of the inventory management system for preparing and picking goods according to a third embodiment of the present disclosure. Based on the above embodiment, how to achieve goods picking with the inventory system running in the picking scenario is described in detail. In the embodiment, the workstation 204 is a picking station.

The control server 201 is configured to determine, in response to an item picking request, the target picking shelf 207 where the inventory item to be picked is located or a target picking container 209 where the inventory item to be picked is located and the picking shelf 207 where the target picking container 209 is located, and to determine a third robot 2023 for transporting the target picking shelf 207 or the target picking container 209, and the target picking station for performing picking operations; and is configured to plan a traveling path for the third robot 2023; and configured to send a control instruction to the third robot 2023; and the third robot 2023 is configured to travel, in response to the control instruction, to the high shelf 206 where the target picking shelf 207 is located according to the planned traveling path, and to obtain the target picking shelf 207 from the bottom layer of the high shelf 206 and transport the target picking shelf 207 to the target picking station. Or, the third robot 2023 is configured to travel to the high shelf 206 where the picking shelf 207 storing the target picking container 209 is located according to the planned traveling path, and to obtain the target picking container 209 from the picking shelf 207 at the bottom layer of the high shelf 206 and transport the target picking container 209 to the target picking station. The picking staff or picking equipment 220 of the target picking station performs the picking operation in accordance with information of a picking order.

In this embodiment, the item picking request may be a request sent by the upstream system to the control server after the upstream system receives a new order. Optionally, the item picking request may include information about the picking order to be processed, and the information about the picking order may include the type and quantity of items required for the order. The third robot 2023 may have the same structure as the first robot 2021.

With reference to FIG. 4A, the whole operation process is as follows: the upstream system sends the item picking request to the control server 201 after receiving a new order; the control server 201 determines, in response to the item picking request, the target picking shelf 207 or the target picking container 209 according to the picking order information, current inventory information and picking strategy in the item picking request; and determines the target picking station for manipulating the target picking shelf 207 or the target picking container 209 according to the status of the operation task of each picking station; based on the shortest path principle, and the working status of each robot, the control server 201 then determines the third robot 2023 for transporting the target picking shelf 207 or the target picking container 209, in the meantime plans the traveling path for the third robot 2023; and sends the control instruction to the third robot 2023.

According to the autonomous navigation function, the identifier of the high shelf 206 where the target picking shelf 207 is located and the traveling path included in the control instruction, the third robot 2023 travels, in response to the control instruction, to the high shelf 206 where the target picking shelf 207 is located, and obtains the target picking shelf 207 from the bottom layer of the high shelf 206 and transports the target picking shelf 207 to the target picking station, and then the picking staff or picking equipment 220 of the target picking station performs the picking operation in accordance with the picking order information, such as the case of the first picking station shown in FIG. 4B. Or, the third robot 2023 travels, in response to the control instruction, to the high shelf 206 according to the autonomous navigation function, the identifier of the high shelf 206 where the picking shelf 207 storing the target picking container 209 is located and the traveling path included in the control instruction, and then obtains the target picking container 209 from the picking shelf 207 at the bottom layer of the high shelf 206 and transports the target picking container 209 to the target picking station, and then the picking staff or picking equipment 220 of the target picking station performs the picking operation in accordance with the picking order information, such as the case of the Nth picking station shown in FIG. 4A.

It should be noted that, with the target picking shelf 207 being transported by the third robot 2023 as an example, during this process, the third robot 2023 can place the target picking shelf 207 at a designated position of the target picking station after transporting the target picking shelf 207 to the target picking station, so that the picking equipment or picking staff 220 in the target picking station performs the picking operation in accordance with the picking order information; the third robot 2023 can then continue to respond to other control instruction sent by the control server 201 to remove the correlation between the third robot 2023 and the target picking shelf 207. The third robot 2023 may always keep docking with the target picking shelf 207, that is, the target picking shelf 207 always keeps the correlation with the third robot 2023. That is to say, during the process of manipulating the target picking shelf 207, the third robot 2023 always waits at a certain position for the operation to the target picking shelf 207 to be completed; or, the target picking shelf 207 is always on the third robot 2023, and the picking equipment or picking staff 220 directly manipulates the target picking shelf 207 on the third robot 2023.

By way of example, the third robot 2023 may be configured to always keep docking with the target picking shelf 207 or the target picking container 209 during the process that the target picking shelf 207 or the target picking container 209 is manipulated; or, the third robot 2023 may be configured to wait for and execute other control instructions after placing the target picking shelf 207 or the target picking container 209 at the designated position of the target picking station.

In an optional implement manner of the embodiment of the present disclosure, if the third robot 2023 is configured to always keep docking with the target picking shelf 207 or the target picking container 209 during the process of manipulating the target picking shelf 207 or the target picking container 209, as for the process of transporting to the target picking station, reference can be made to FIG. 4B, the specific operation process of transporting from the target picking station to the inventory zone is as follows: when the control server 201 detects that the operation to the target picking shelf 207 or the target picking container 209 is finished, or the control server 201 receives a picking completion request sent by the picking staff, the control server 201 sends the control instruction to the third robot 2023; the third control robot 2023 transports the target picking shelf 207 from the target picking station to the inventory zone 205 in accordance with the control instruction. To be specific, the target picking shelf 207 may be placed in the original position that is the bottom layer of the high shelf 206 where the target picking shelf 207 is located, such as the case of the first picking station shown in FIG. 4B. It is also feasible that the target picking shelf 207 is placed on the bottom layer of other vacant high shelf 206 with the bottom layer for storing the picking shelf 206 in the inventory zone 205.

It is also feasible that, the third robot 2023 transports the target picking container 209 from the target picking station to the inventory zone 205 in accordance with the control instruction. To be specific, the target picking container 209 may be placed in the original position, that is, the target picking container 209 is transported to the high shelf 206 where the picking shelf 207 storing the target picking container is located, and the target picking container 209 is placed on this picking shelf 207, such as the case of the Nth picking station shown in FIG. 4B. It is also feasible that the target picking container 209 is placed on other picking shelf 207.

In an optional implement manner of the embodiment of the present disclosure, the robot may further include a fourth robot 2024, and the fourth robot 2024 may have the same structure as the third robot 2023.

In an embodiment, the third robot 2023 is configured to wait for and execute other control instructions after placing the target picking shelf 207 or the target picking container 209 at the designated position of the target picking station. By way of example, the control server 201 may be configured to determine, in response to the picking completion request, the fourth robot 2024 for transporting the target picking shelf 207 or the target picking container 209; plan the traveling path for the fourth robot 2024; and send the control instruction to the fourth robot 2024; and the fourth robot 2024 is configured to obtain, in response to the control instruction, the target picking shelf 207 or the target picking container 209 from the target picking station according to the planned traveling path, and transport the target picking shelf 207 or the target picking container 209 to the inventory zone.

In this embodiment, the picking completion request may be an instruction sent by the picking staff or the upstream system to the control server, to inform the control server that this picking task has been completed, and that the target picking shelf or the target picking container can be transported to the inventory zone. The picking completion request may also be an instruction which is issued when a detection device in the control server detects that the picking task has been completed.

Specifically, referring to FIG. 4C, when the picking staff or the upstream system determines that the picking task has been completed, the picking completion request can be sent to the control server 201. The control server 201 responds to the picking completion request and determines, according to the picking completion request, where the target picking shelf 207 or the target picking container 209 is stored, and determines the high shelf 206 where the target picking shelf 207 is placed; or, the picking shelf 207 where the target picking container 209 is located and the high shelf 206 where the picking shelf 207 is located; based on the shortest path principle, and the working status of each robot, the control server 201 then determines the fourth robot 2024 for transporting the target picking shelf 207 or the target picking container 209, and in the meantime plans the traveling path for the fourth robot 2024, sends the control instruction to the fourth robot 2024.

According to the autonomous navigation function, the identifier of the high shelf 206 where the target picking shelf 207 is located and the traveling path included in the control instruction, the fourth robot 2024 travels, in response to the control instruction, to the high shelf 206 where the target picking shelf 207 is located; then determines the storage position of the target picking shelf 207 at the bottom layer of the high shelf 206, that is the location where the target picking shelf 207 is to be stored, and places the target picking shelf 207 in this position. Or, according to the autonomous navigation function, the identifier of the high shelf where the picking shelf 207 storing the target picking container 209 is located and the traveling path included in the control instruction, the fourth robot 2024 travels to the high shelf 206, determines where the picking shelf 207 for storing the target picking container 209 is located on the bottom layer of the high shelf 206, determines where the target picking container 209 is to be placed on the picking shelf 207, and places the target picking container 209 in this position.

Optionally, the fourth robot 2024 may place the target picking shelf 207 in the original position or place the target picking shelf 207 on the bottom layer of other vacant high shelf 206 with the bottom layer for storing the picking shelf 206 in the inventory zone 205; or, the fourth robot 2024 may place the target picking container 209 in the original position or place the target picking container 209 on other picking shelf 207.

According to the technical solution provided by the embodiments of the present disclosure, an inventory zone for preparing and picking goods is formed by overlapping the conventional stocking zones and picking zones in physical space, and the existing area of the warehouse is fully utilized, which does not affect the number of workstations while ensuring that the warehouse can store a large number of items, and achieves a balance between the picking efficiency and the storage efficiency. Beside, in a case that the inventory system is running in the picking scenario, the picking task can be orderly performed through the cooperation of the control server and the robot in the inventory system.

Fourth Embodiment

Figure 5A:
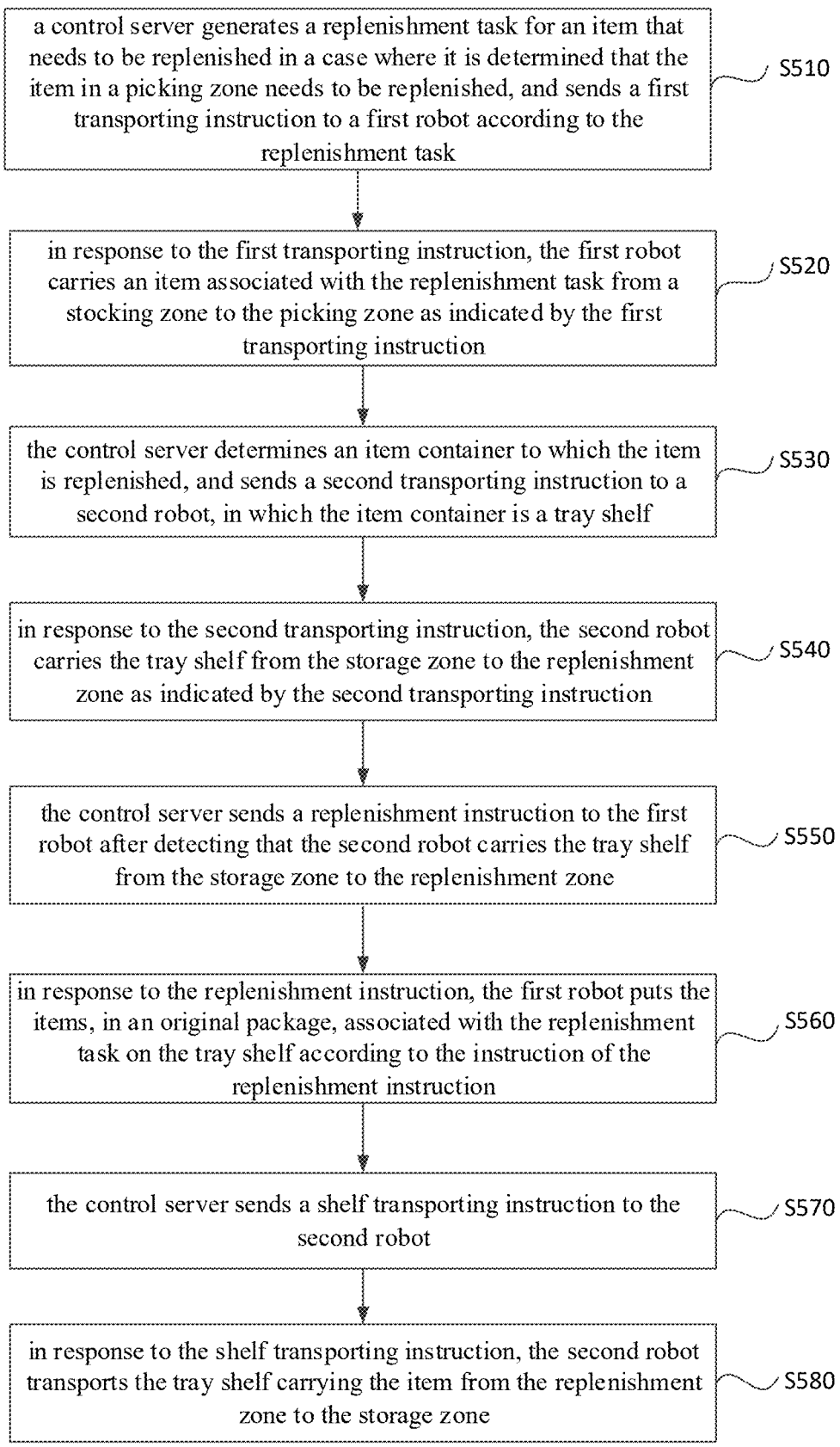
FIG. 5A to 5C are schematic diagrams showing the working process of the inventory management system for preparing and picking goods according to a fourth embodiment of the present disclosure.
Figure 5B:
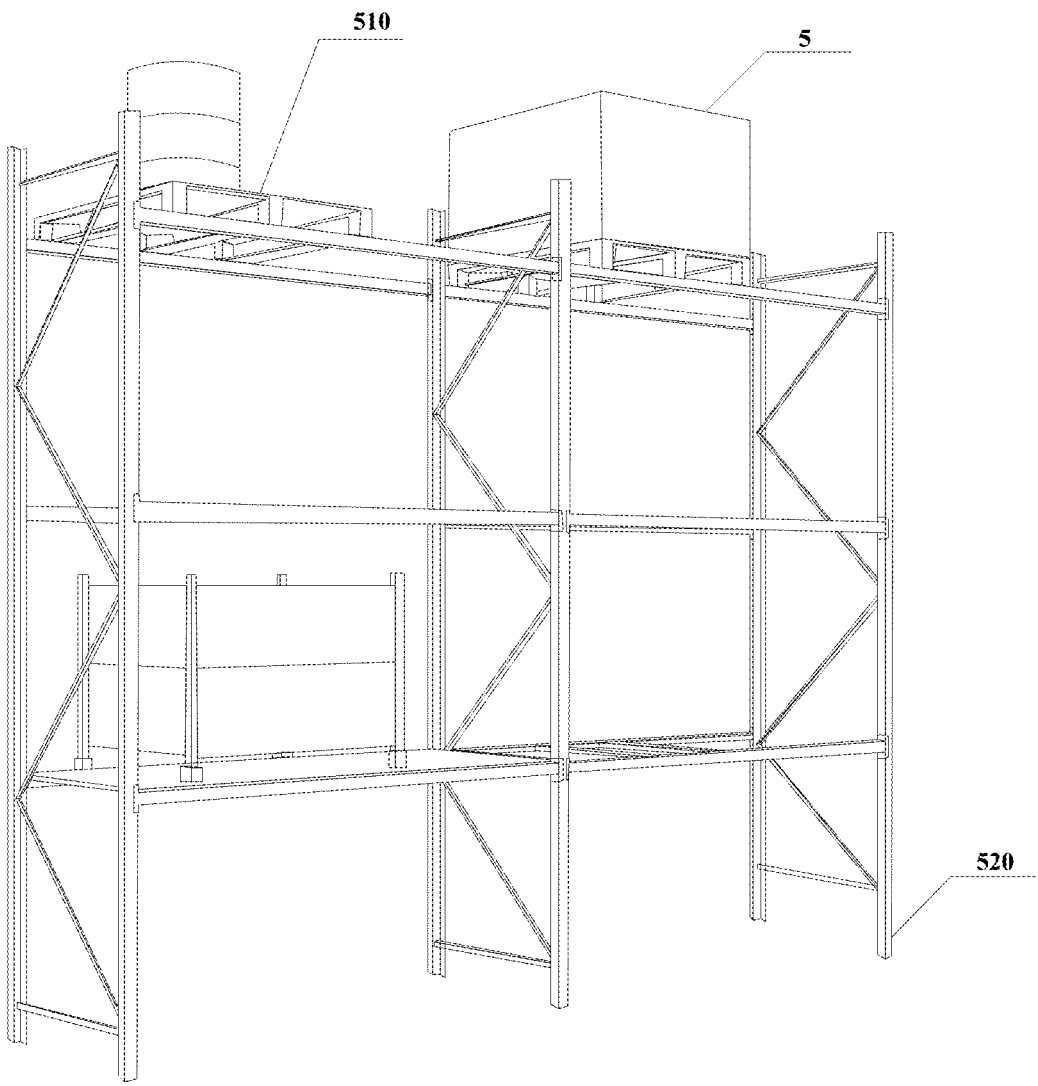
Figure 5C:
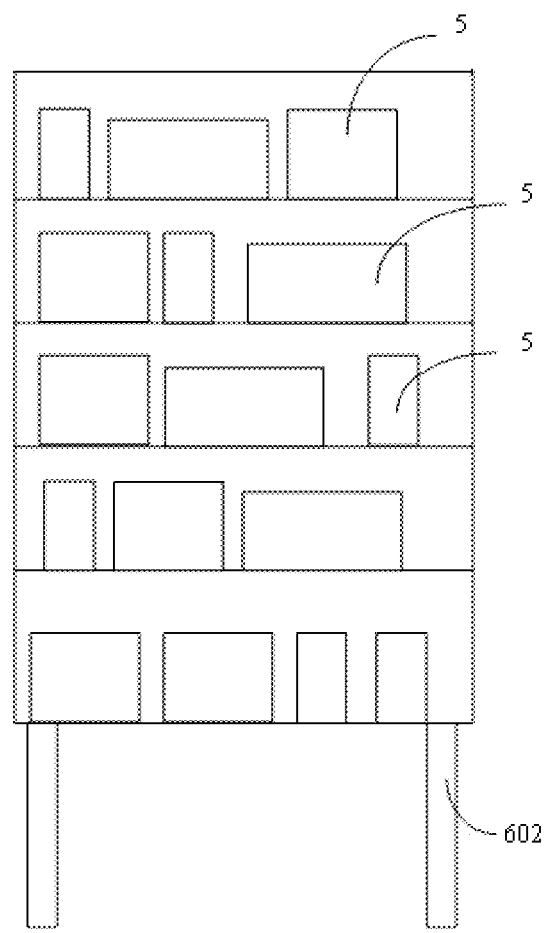

FIG. 5A to 5C are schematic diagrams showing the working process of the inventory management system for preparing and picking goods according to a fourth embodiment of the present disclosure. Based on the above embodiment, how to achieve goods uploading with the inventory system running in an uploading scenario is described in detail. In the embodiment, the workstation 204 is an uploading station.

Referring to FIG. 5A, when determining that a bulk item has reached the warehouse and the bulk item is required to be uploaded to the high shelf, the upstream system sends an uploading request to the control server 201; the control server 201 determines, in response to the uploading request, the target storage container 208 for storing the bulk item, the target high shelf 206 for storing the storage container 208, the target uploading station for performing the uploading operation, the third access device 2033 for transporting the target storage container 208 according to the item type, current inventory information and storage strategy in the uploading request, and in the meantime plans the traveling path for the third access device 2033, sends the control instruction to the third access device 2033. According to the autonomous navigation function, the identifier of the target high shelf 206 where the target storage container 208 is placed and the traveling path included in the control instruction, the third access device 2033 travels, in response to the control instruction, to the high shelf 206 where the storage container 208 is stored; then takes out, according to the identifier of the target storage container 208, the target storage container 208 from the target high shelf 206 and transports the target storage container 208 to the target uploading station. Then the target storage container 208 can be placed at a designated position of the target uploading station, so that the uploading equipment or uploading staff 230 in the target uploading station can upload the item to the target storage container 208.

If the third access device 2033 is configured to always keep docking with the target storage container 208 during the process of manipulating the target storage container 208, the control server 201 sends the control instruction to the third access device 2033, when the control server 201 detects that the operation to the target storage container 208 is finished, or when the control server 201 receives the uploading completion request sent by the uploading staff. The third access device 2033 transports the target storage container 208 from the target uploading station to the inventory zone 205 in accordance with the control instruction. To be specific, the target storage container 208 may be placed in the original position, that is, the target storage container 208 is transported to the target high shelf 206 where the target storage container 208 is located, and the target storage container 208 is then placed on the target high shelf 206, as shown in FIG. 5B. Further, the third access device 2033 may place the target storage container 208 onto other high shelf 206 (not shown in FIG. 2G).

If the third robot 2033 is configured to wait for and execute other control instructions after placing the target storage container 208 at the designated position of the target uploading station, the control server 201 is configured to determine, in response to the uploading completion request, the high shelf 206 where the target storage container 208 is stored, and determine where the target storage container 208 is placed on the high shelf 206 according to the uploading completion request; and then based on the shortest path principle, and the working status of each access device, the control server 201 then determines the fourth access device 2034 for storing the target storage container 208, in the meantime plans the traveling path for the fourth access device 2034; and sends the control instruction to the fourth access device 2034.

According to the autonomous navigation function, the identifier of the target high shelf 206 where the target storage container 208 is to be stored and the traveling path included in the control instruction, the fourth access device 2034 travels, in response to the control instruction, to the high shelf 206; and then places the target storage container 208 on the high shelf 206.

Optionally, the fourth access device 2034 may place the target storage container 208 in the original position or place the target storage container 208 on other high shelf 206.

According to the technical solution provided by the embodiments of the present disclosure, an inventory zone for preparing and picking goods is formed by overlapping the conventional stocking zones and picking zones in physical space, and the existing area of the warehouse is fully utilized, which does not affect the number of workstations while ensuring that the warehouse can store a large number of items, and achieves a balance between the picking efficiency and the storage efficiency. Beside, in a case that the inventory system is running in the uploading scenario, the uploading task can be orderly performed through the cooperation of the control server and the access device in the inventory system.

Fifth Embodiment

Figure 6A:
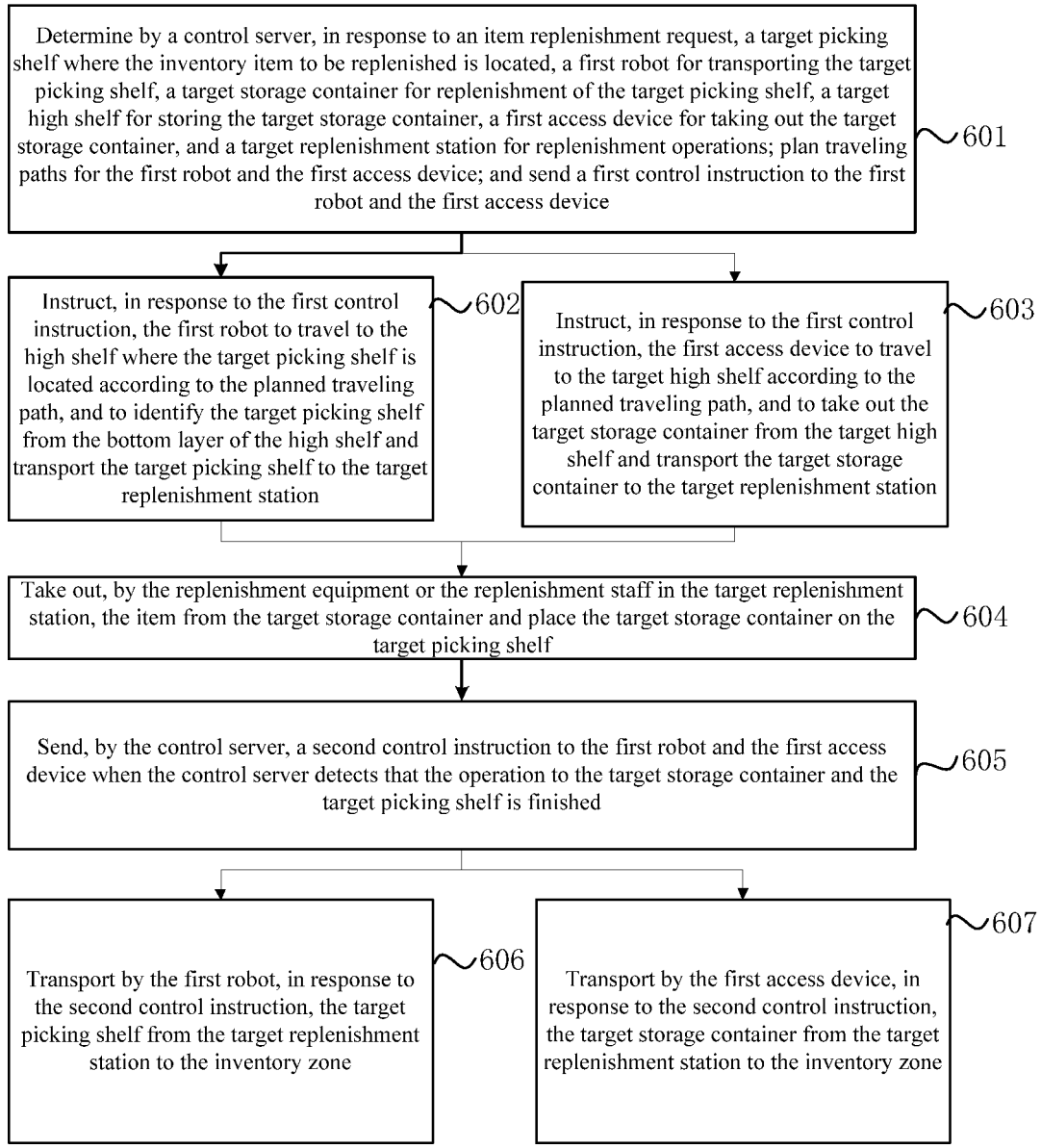
FIGS. 6A and 6B are schematic flowcharts of an inventory management method for preparing and picking goods according to a fifth embodiment of the present disclosure.
Figure 6B:
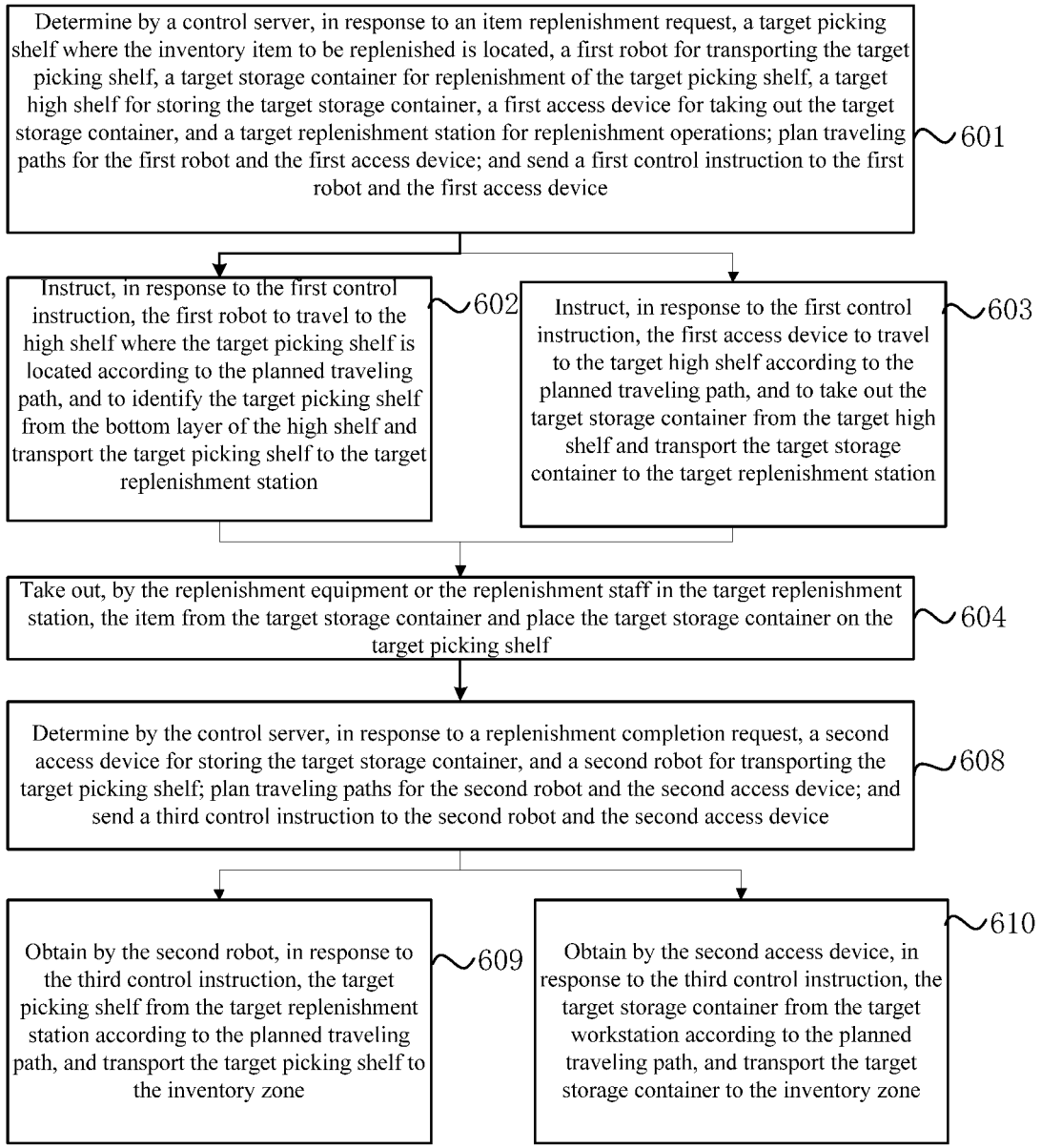

FIGS. 6A and 6B are schematic flowcharts of an inventory management method for preparing and picking goods according to a fifth embodiment of the present disclosure. This method can be implemented by the inventory system for preparing and picking goods disclosed by the above embodiments. The inventory management method for preparing and picking goods according to the present embodiment is applicable to the situation of how to balance the picking efficiency and the storage efficiency of the warehouse in a warehouse environment with a fixed area, and is particularly applicable to situations where items located in the inventory zone are operated under picking, replenishing or other operation scenarios. Under different operation scenarios, the workstation has different names. The replenishment station, the picking station, and the uploading station may share a same workstation. The workstation is the replenishment station in the replenishment scenario, the picking station in the picking scenario, and the uploading station in the uploading scenario. Referring to FIGS. 6A and 6B, the inventory management method for preparing and picking goods according to the embodiment of the present disclosure includes:

S601, determining by a control server, in response to an item replenishment request, a target picking shelf where the inventory item to be replenished is located, a first robot for transporting the target picking shelf, a target storage container for replenishment of the target picking shelf, a target high shelf for storing the target storage container, a first access device for taking out the target storage container, and a target replenishment station for replenishment operations; planning traveling paths for the first robot and the first access device; and sending a first control instruction to the first robot and the first access device;

wherein the target high shelf and the target picking shelf are located in an inventory zone for preparing and picking goods, the inventory zone includes multiple high shelves and multiple picking shelves, each of the multiple high shelves includes at least one plate, the at least one plate divides the high shelf into at least two layers, a picking shelf is placed at a bottom layer of at least one of the multiple high shelves, at least one storage container is placed on each of layers other than the bottom layer where the picking shelf is placed, the storage container contains inventory items for replenishment of the picking shelf, and the picking shelf contains inventory items available for picking.

In an optional implement manner of the embodiment of the present disclosure, the access device is an unmanned forklift for a narrow roadway, and the fork-extending direction of the unmanned forklift for a narrow roadway is perpendicular to the traveling direction of the forklift.

S602, instructing, in response to the first control instruction, the first robot to travel to the high shelf where the target picking shelf is located according to the planned traveling path, and to identify the target picking shelf from the bottom layer of the high shelf and transport the target picking shelf to the target replenishment station.

S603, instructing, in response to the first control instruction, the first access device to travel to the target high shelf according to the planned traveling path, and to take out the target storage container from the target high shelf and transport the target storage container to the target replenishment station.

S604, taking out, by the replenishment equipment or the replenishment staff in the target replenishment station, the item from the target storage container and place the target storage container on the target picking shelf.

It should be noted that, there is no priority in performing the step S620 by the first robot and performing the step S630 by the first access device, the two steps can be performed simultaneously.

In an optional manner of the embodiment of the present disclosure, the picking shelf includes at least one plate, the at least one plate divides the picking shelf into at least two layers, and at least one picking container is placed on each layer of the picking shelf, and the picking container contains inventory items available for picking. The inventory management method for preparing and picking goods according to the embodiment of the present disclosure includes:

determining by the control server, in response to the item replenishment request, a target picking container where the inventory item to be replenished is located and the picking shelf where the target picking container is located, the first robot for transporting the target picking container; planning the traveling path for the first robot; and sending the first control instruction to the first robot; and instructing, in response to the first control instruction, the first robot to travel to the picking shelf where the target picking container is located according to the planned traveling path, and to identify the target picking container from the picking shelf and transport the target picking container to the target workstation.

That is, the first robot can transport the target picking shelf, and can also transport the target picking container. However, the robot can only transport one of the target picking shelf and the target picking container at one moment.

In an optional implement manner of the embodiment of the present disclosure, if the first robot always keeps docking with the target picking shelf or the target picking container during the process of manipulating the target picking shelf or the target picking container; and the first access device always keeps docking with the target storage container during the process of manipulating the target storage container, after S604, the inventory management method for preparing and picking goods according to the embodiment of the present disclosure further includes:

S605, sending, by the control server, a second control instruction to the first robot and the first access device when the control server detects that the operation to the target storage container and the target picking shelf is finished;

or, sending, by the control server, a second control instruction to the first robot and the first access device when the control server detects that the operation to the target storage container and the target picking container is finished.

S606, transporting by the first robot, in response to the second control instruction, the target picking shelf from the target replenishment station to the inventory zone;

or, transporting by the first robot, in response to the second control instruction, the target picking container from the target replenishment station to the inventory zone.

S607, transporting by the first access device, in response to the second control instruction, the target storage container from the target replenishment station to the inventory zone.

In an optional implement manner of the embodiment of the present disclosure, after the first access device travels, in response to the first control instruction, to the target high shelf according to the planned traveling path, and takes out the target storage container from the target high shelf and transports the target storage container to the target workstation, the method further includes: the control server sends a placing instruction to the first robot and the first access device; the first robot waits for and executes, in response to the placing instruction, other control instructions after placing the target picking shelf or the target picking container at a designated position of the target replenishment station; and the first access device waits for and executes, in response to the placing instruction, other control instructions after placing the target storage container at the designated position of the target replenishment station. After S604, the inventory management method for preparing and picking goods according to the embodiment of the present disclosure further includes:

S608, determining by the control server, in response to a replenishment completion request, a second access device for storing the target storage container, and a second robot for transporting the target picking shelf; planning traveling paths for the second robot and the second access device; and sending a third control instruction to the second robot and the second access device;

or, determining by the control server, in response to the replenishment completion request, the second access device for storing the target storage container, and the second robot for transporting the target picking container; planning traveling paths for the second robot and the second access device; and sending the third control instruction to the second robot and the second access device.

S609, obtaining by the second robot, in response to the third control instruction, the target picking shelf from the target replenishment station according to the planned traveling path, and transporting the target picking shelf to the inventory zone;

or, obtaining by the second robot, in response to the third control instruction, the target picking container from the target replenishment station according to the planned traveling path, and transporting the target picking container to the inventory zone.

S610, obtaining by the second access device, in response to the third control instruction, the target storage container from the target workstation according to the planned traveling path, and transporting the target storage container to the inventory zone.

In an optional implement manner of the embodiment of the present disclosure, if the target picking shelf where the inventory item to be replenished is a vacant tray shelf, the target storage container is a target tray, and the inventory management method for preparing and picking goods according to the embodiment of the present disclosure further includes:

determining by the control server, in response to the item replenishment request, the target picking shelf where the inventory item to be replenished is located, the target storage container for replenishment of the target picking shelf, the target high shelf for storing the target storage container, and the first access device for taking out the target storage container; planning the traveling path for the first access device; and sending a fourth control instruction to the first access device; and instructing, in response to the fourth control instruction, the first access device to travel to the target high shelf according to the planned traveling path, and to take out the target storage container from the target high shelf and transport the target storage container to the target picking shelf, and place the target tray on the target picking shelf.

In an embodiment of the present disclosure, the picking shelf may be a tray shelf or a partition plate shelf.

Figure 7A:
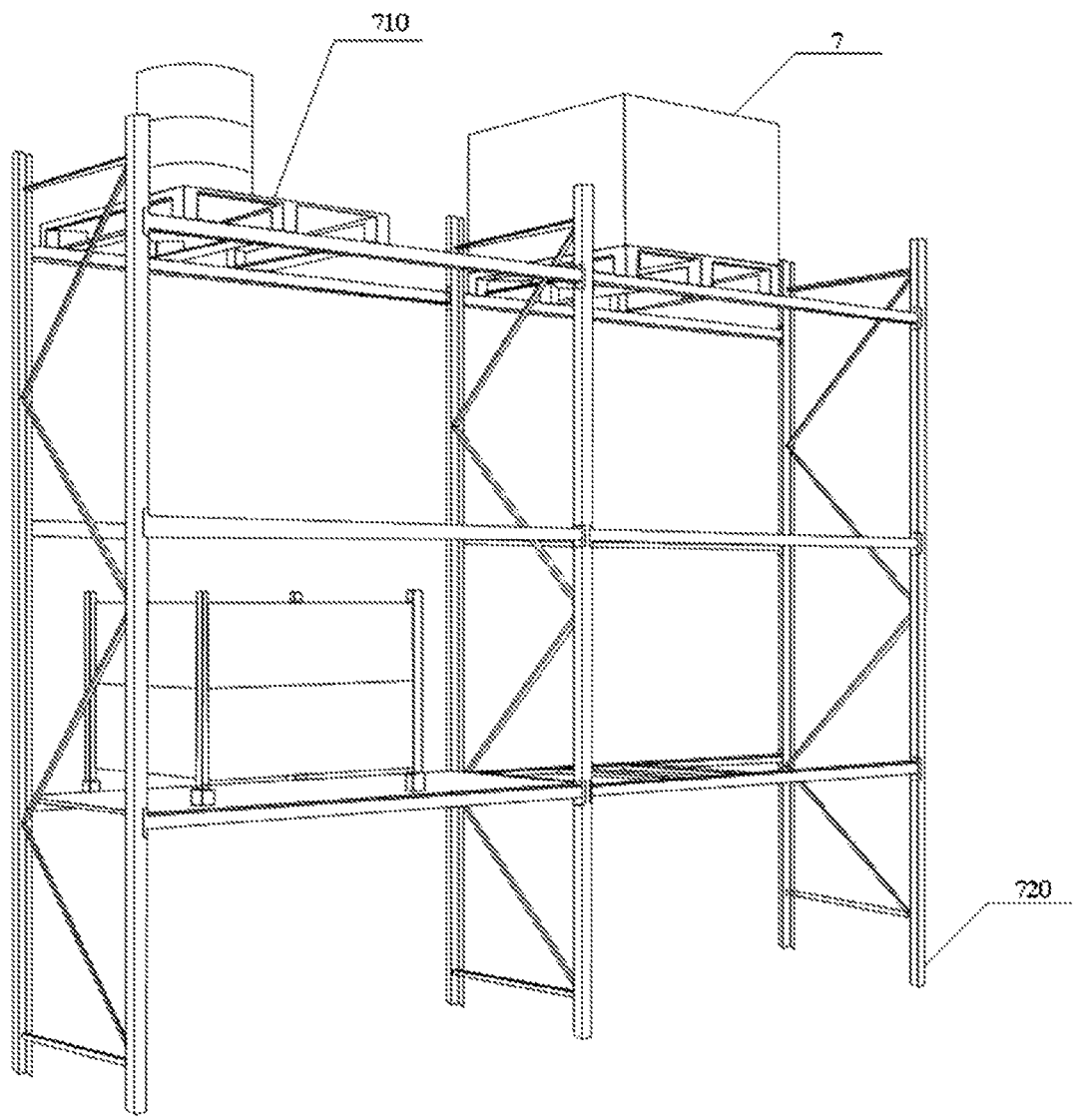
FIG. 7A is a schematic structural diagram of a tray shelf according to an embodiment of the present disclosure.

The tray shelf is also referred to as a beam shelf, which is a heavy shelf that can hold the tray and is formed by connecting horizontal pull rods, vertical pull rods, and beams. FIG. 7A is a schematic structural diagram of the tray shelf according to an embodiment of the present disclosure. Reference numeral 710 in the figure represents a tray which can accommodate one or more items 7. The type, specification, and dimension of the tray in the tray shelf can be determined according to the storage specification and weight, etc. of the item in the actual situation. By way of example, the tray shelf includes one or more vertical pull rods 720 as the support portion.

Specifically, when the control server detects that there is an available tray shelf in the inventory zone and there is only one available tray shelf, this tray shelf can be used as the picking shelf, and the control server can select one first robot from all the first robots that are idle in the picking zone according to an optimal path principle. If there are multiple tray shelves, the control server can select an empty tray shelf from the inventory zone as the picking shelf according to the actual replenishment amount and the like, and establish the correlation between the tray shelf and the replenishment task of the items, and calculate, according to the optimal path principle, the distance between all idle first robots in the inventory zone and the tray shelf to determine the first robot.

By way of example, if there is no available tray shelves in the inventory zone and the control server determines that the picking shelf is the partition plate shelf, and the control server receives a splitting instruction, the operations after a transporting instruction is sent to the first robot include:

A, the first robot transports, in response to the transporting instruction, the partition plate shelf to the target replenishment station according to the transporting instruction, so as to split the items associated with the replenishment task and put them on the target partition plate shelf.

Figure 7B:
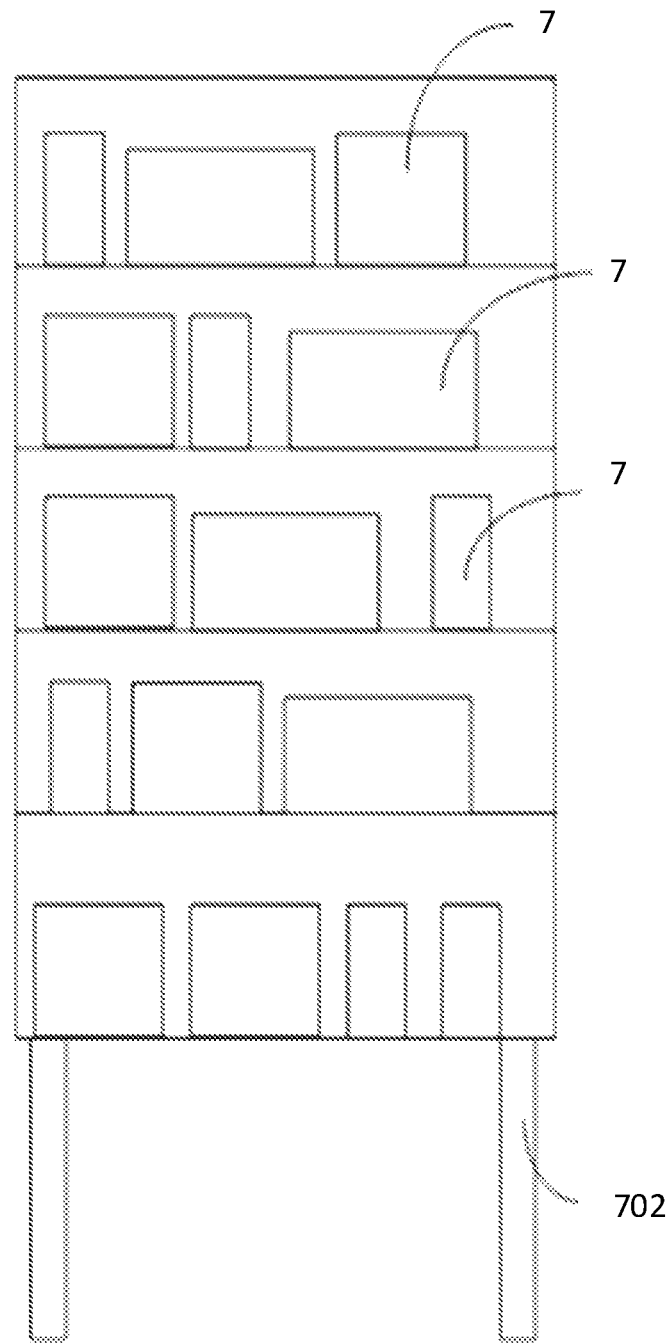
FIG. 7B is a schematic structural diagram of a partition plate shelf according to an embodiment of the present disclosure.

The partition plate shelf is formed by vertically stacking multiple fixed partition plates. Due to the restriction of the partition plates in the partition plate shelf, the items cannot be put on the shelf in the original package. As shown in FIG. 7B, the partition plate shelf includes multiple separation layers stacked vertically, each separation layer can accommodate multiple items 7. Apparently, the items 7 can also be stored in the storage container. The partition plate shelf includes one or more support portions 702. Besides, in a particular embodiment, the items 7 may be hung by a hook or rod in or on the shelf. The items 7 on the shelf can be placed inside the shelf or on an outer surface of the shelf in any suitable manner.

The splitting instruction refers to the instruction triggered by the picking staff in the target replenishment station, which is used to inform the control server that there are staff at the target replenishment station, and that the first robot can be dispatched to transport the partition plate shelf to the target replenishment station, so that the items associated with the replenishment task in the replenishment zone can be split and put on the shelf by the picking staff.

Specifically, when the control server detects no available tray shelves and receives the splitting instruction sent by the picking staff, the control server can randomly select an empty partition plate shelf from the storage zone, and establish the correlation between this partition plate shelf and the replenishment task of the items, and select one first robot from all the first robots that are idle in the picking zone according to the optimal path principle, and determine the path plan between the first robot and the position of the partition plate shelf and determine the path plan between the position of the partition plate shelf and the position of the items associated with the replenishment task at the target replenishment station, and send the transporting instruction including the above-mentioned path plans to the first robot. In response to the transporting instruction, the first robot transports the partition plate shelf to the target replenishment station according to the transporting instruction. It should be noted that the partition plate shelf transported by the first robot at this time is empty.

After the first robot transports the partition plate shelf to the target replenishment station, the picking staff perform the splitting and uploading operation until all the items associated with the replenishment task are put on the partition plate shelf.

B, the control server sends a shelf transporting instruction to the first robot.

C, the first robot transports, in response to the shelf transporting instruction, the partition plate shelf carrying the items into the inventory zone.

Specifically, when the control server detects that the items associated with the replenishment task have been put on the partition plate shelf, the control server sends the shelf transporting instruction to the first robot; the first robot transports, in response to the shelf transporting instruction, the partition plate shelf carrying the items into the inventory zone, thereby achieving automatic replenishment.

According to the technical solution provided by the embodiments of the present disclosure, when there is no available tray shelf in the inventory zone, the partition plate shelf is selected for splitting and uploading. In this way, automatic replenishment is realized, the flexibility of replenishment is increased, the replenishment efficiency and the picking efficiency are improved, and labor costs are reduced.

By way of example, if there is only one available tray shelf, and the actual replenishment amount of the items associated with the replenishment task is large, and the tray shelf is insufficient to carry the items of the actual replenishment amount, it is also feasible to use the tray shelf and the partition plate shelf to transport the items associated with the replenishment task at the same time to realize automatic replenishment.

According to the technical solution provided by the embodiments of the present disclosure, an inventory zone for preparing and picking goods is formed by overlapping the conventional stocking zones and picking zones in physical space, and the existing area of the warehouse is fully utilized, which ensures that the warehouse can store a large number of items and the number of workstations is not affected. Besides, in the inventory zone, under the cooperation of the control server, the robot and the access device in the inventory system, the operation for the high shelf and the operation for the picking shelf do not affect each other in physical space and are performed orderly, which in turn realizes the balance of the picking efficiency and the storage efficiency.

Sixth Embodiment

The sixth embodiment of the present disclosure further provides an inventory zone for preparing and picking goods. With reference to FIGS. 2A to 2D and related description in the above embodiments, the inventory zone may include multiple high shelves and multiple picking shelves. Each several of the multiple high shelves can be arranged into a rectangular high shelf group, the high shelf groups can be arranged in an array, and the spacing in the array is the passageway for the access device and the robot.

Each of the multiple high shelves includes at least one plate, and the at least one plate divides the high shelf into at least two layers; a picking shelf is placed on a bottom layer of at least one of the multiple high shelves, and at least one storage container is placed on each of layers other than the bottom layer where the picking shelf is placed. In an optional implement manner of the embodiment of the present disclosure, at least one picking shelf is placed on the bottom layer of at least one high shelf.

The storage container contains inventory items for replenishment of the picking shelf. In this embodiment, the storage container may, for example, be a tray, a material box, or a custom-made container suitable for storing corresponding inventory items. In an optional implement manner of the embodiment of the present disclosure, the storage container is a tray.

The picking shelf contains inventory items available for picking. In an optional manner of the embodiment of the present disclosure, the picking shelf includes at least one plate, the at least one plate divides the picking shelf into at least two layers. At least one picking container is placed on each layer of the picking shelf, and the picking container contains inventory items available for picking. Optionally, the inventory items available for picking may be directly placed on the picking shelf, or may be placed in the picking container. The picking container is placed in the picking shelf. The picking container may, for example, be a material box, a cardboard box, a circulation box, or a custom-made container suitable for storing corresponding inventory items.

In the present embodiment, the picking shelf may be a common picking shelf as shown in FIG. 2B, or a tray shelf. In actual application scenarios, the tray shelf and the common picking shelf may both exist. In an optional implement manner of the present embodiment, the high shelf or the picking shelf may include multiple plates stacked in the vertical direction. For the high shelf, one or more storage containers can be stored on each plate. For the picking shelf, one or more picking containers can be stored on each plate, or one or more inventory items can be stored on each plate.

According to the technical solution provided by the embodiments of the present disclosure, an inventory zone for preparing and picking goods is formed by overlapping the conventional stocking zones and picking zones in physical space, and the existing area of the warehouse is fully utilized, which does not affect the number of workstations while ensuring that the warehouse can store a large number of items, and achieves a balance between the picking efficiency and the storage efficiency.

Index numbers of the embodiments are only for description, and do not represent the sequence of performance levels of the embodiments.

Those of ordinary skill in the art will appreciate that each module or operation in the embodiments of the present disclosure can be implemented with a general-purpose computing device, which can be integrated on a single computing device or distributed over a network composed of multiple computing devices. Optionally, they can be implemented with program code executable by computer devices, so that they can be stored in a storage device and be executed by a computing device, or they can be separately fabricated into individual integrated circuit modules, or multiple modules or operations in them can be fabricated into a single integrated circuit module for implementation. Thus, the present disclosure is not limited to the combination of any particular hardware and software.

The above embodiments are described in a progressive manner. Each of the embodiments is mainly focused on describing its differences from other embodiments, and references may be made among these embodiments with respect to the same or similar parts.

The above are only preferred embodiments of the present disclosure, and are not intended to limit the present disclosure. For those skilled in the art, the present disclosure can have various modifications and changes. Any modifications, equivalent substitutions or improvements made within the spirit and principle of the present disclosure fall within the protection scope of the present disclosure.

Figure 8A:
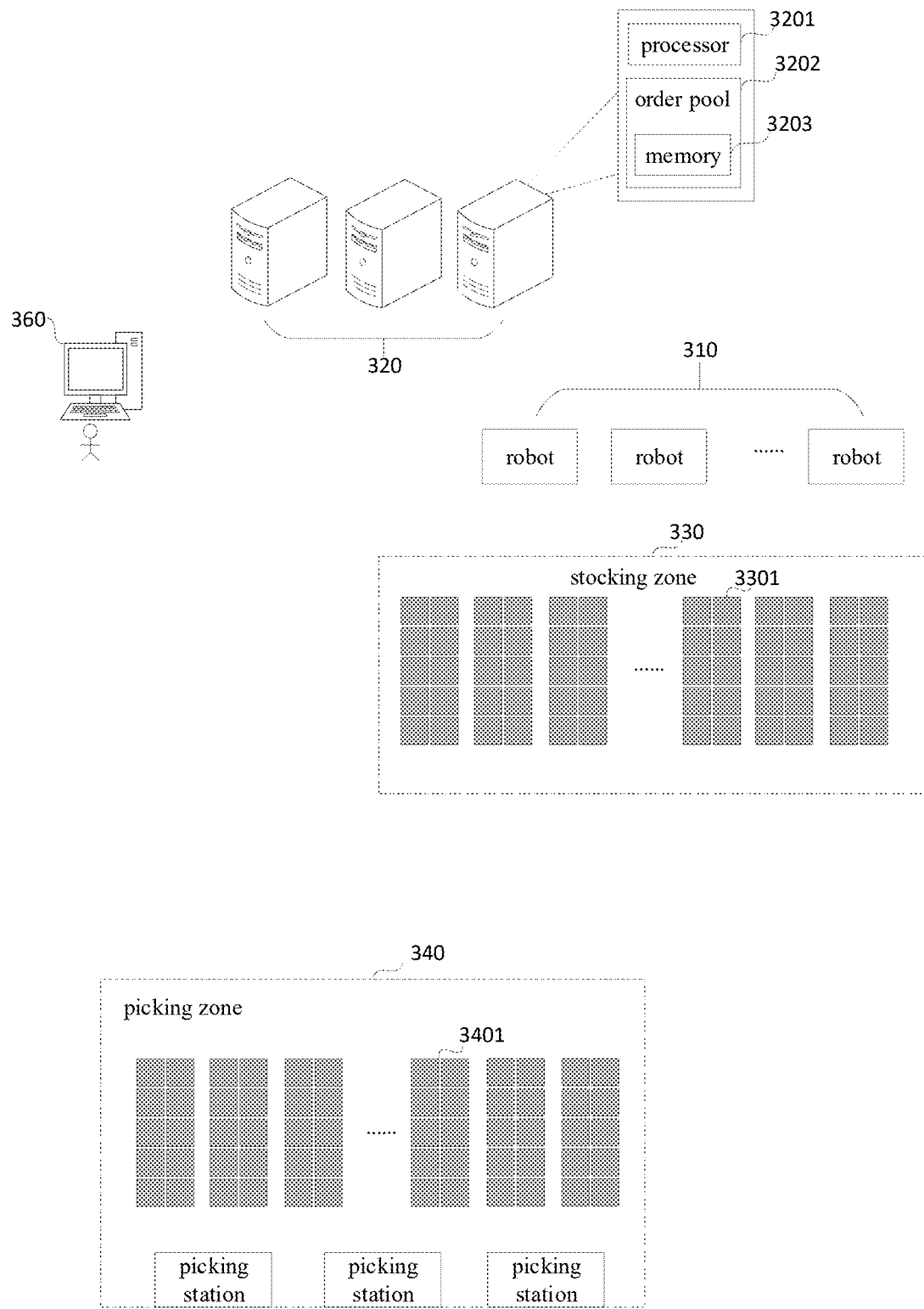
FIG. 8A is a schematic structural diagram of a storage system for automatic replenishment applied to embodiments of the present disclosure.

FIG. 8A is a schematic structural diagram of a storage system for automatic replenishment applied to embodiments of the present disclosure. The storage system includes: a robot 310, a control server 320, a stocking zone 330, and a picking zone 340. The stocking zone 330 is provided with multiple shelves 3301 (for example, in order to improve the storage efficiency of a warehouse, the shelf may be a high shelf). Various bulk inventory items (such as a whole box of cola) that may be replenished to the picking zone are stored on the high shelf 3301. The picking zone 340 is also provided with multiple shelves 3401. Items are placed on the picking shelf 3401, and when responding to an order task, these items may be picked into an order container, and one order container may be associated with at least one order.

The control server 320 performs wireless communication with the robot 310, the operator may operate the control server 320 through a console 60, and the robot 310 performs a cargo handling task under the control of the control server 320. In a case where the picking zone is out of stock, the robot 310 transports the bulk inventory items from the stocking zone 330 to the picking zone 340, allowing the operator (staff or other automated equipment) to put the bulk inventory items on the picking shelf 3401 in the picking zone.

The control server 320 plans movement paths for the robot 310 according to the task, and the robot 310 travels along the vacant space (part of the passage of the robot 310) in a shelf array according to the movement path. In order to facilitate the planning of movement paths for the robot 310, a working region (the working region includes at least the region where the stocking zone 330 and the picking zone 340 are located) of the robot 310 is divided into multiple sub-regions (that is. cells) in advance, and the robot 310 move cell by cell to form a movement track.

The control server 320 is a software system run on a server with data storage and information processing capabilities, and may be connected with the robot, a hardware input system and other software systems via wireless or wired means. The control server 320 may include one or more servers, and have a centralized control architecture or a distributed computing architecture. The control server 320 has a processor 3201 and a memory 3202, and the memory 3202 may have an order pool 3203.

In a system for picking an item, in order to ensure that the number of items in the picking zone in a picking station is sufficient and reduce a duration that a picking staff has to wait to pick the items. the present disclosure provides a scheme for automatically replenishing the items in the picking zone, thereby improving the replenishment efficiency and thus the picking efficiency.

It should be noted that: like numbers and letters refer to like items in the following accompanying drawings, and thus, once an item is defined in one drawing, it need not be further defined and explained in the following accompanying drawings. Moreover, in the description of the present disclosure, terms such as "first" and "second" are used herein for purposes of description and are not intended to indicate or imply relative importance.

SEVENTH EMBODIMENT

FIG. 8A is a schematic structural diagram of a storage system for automatic replenishment applied to embodiments of the present disclosure. This embodiment is applicable to the situation of how to replenish the item in the picking zone of an intelligent warehouse system. The whole set of systems may be executed by the control server cooperating with at least one robot. The control server may be a single-thread or multi-thread server, which may provide strategies for the picking of items, and the allocation of the robot. Referring to FIG. 8A, the system specifically includes: a control server 320 and a robot 310, in which the robot 310 may include a first robot.

The control server 320 is configured to, in a case where it is determined that an item in the picking zone needs to be replenished, generate a replenishment task for the item that needs to be replenished and send a first transporting instruction to the first robot according to the replenishment task; and the first robot is configured to, in response to the first transporting instruction, carry an item associated with the replenishment task from the stocking zone 330 to the picking zone 340 as indicated by the first transporting instruction so that the item may be replenished into an item container in the picking zone 340.

The picking zone 340 refers to a zone for picking the items according to an order of a user.

The replenishment task refers to a task generated by the control server 320 for replenishing the item in a case where the control server 320 detects that the item is out of stock in the picking zone 340 in a daily picking operation process. The replenishment task may include the name of the items to be replenished, the amount of the items to be replenished, a storage position of the items and the like in the stocking zone 330. Optionally, the process of the control server 320 determining that the item in the picking zone 340 needs to be replenished includes: the control server 320 calculates the inventory amount of the items in the picking zone 340, and if the inventory amount is less than or equal to a preset security inventory threshold, it is determined that the item needs to be replenished.

In this embodiment, the inventory amount refers to the number of items currently placed in the picking zone; the security inventory threshold refers to a range of the number of items which may meet the required amount in the daily picking operation process. The security inventory threshold may be for one day, one week or one month, etc. The security inventory threshold may include an upper threshold and a lower threshold. Different items may have different or same security inventory thresholds. In a feasible embodiment, the security inventory threshold may be determined based on the popularity and the popularity level of the goods in a certain period. For example, the down jacket is not so popular in summer, and a lower security inventory threshold may be set for the down jacket, while the T-shirt is more popular in summer, and a higher security inventory threshold may be set for the T-shirt.

Specifically, if the control server 320 detects that a certain item in the picking zone 340 is out of stock, that is, the inventory amount of the item is less than or equal to the lower threshold of the set security inventory threshold of the item, a replenishment task for the item that needs replenishment is generated. Optionally, the control server 320 is further configured to determine the pre-replenishment amount of the item according to the difference between the security inventory threshold and the inventory amount, and determine at least one of the actual replenishment amount of the item and the item container according to the pre-replenishment amount and the storage specification in the stocking zone 330, and generate the replenishment task for the item according to the actual replenishment amount of the item.

The pre-replenishment amount refers to the number of the item in the picking zone 340 out of stock, and may be obtained by subtracting the inventory amount of the item from the security inventory upper threshold of the item. The storage specification refers to a maximum storage space or a maximum storage amount of a certain item that may be accommodated by the item container. If the storage container is a storage box, the item is clothes, and the storage specification refers to the number of clothes when the entire box is filled with the clothes, for example, ten pieces for one box. Different items may have different or same storage specifications. In a feasible solution, the items stored in the stocking zone 330 are stored in accordance with the specification, that is, a whole box, of the items. The actual replenishment amount of the item is an integral multiple of the storage specification of the item in the stocking zone 330, and the actual replenishment amount of the item is equal to or greater than the pre-replenishment amount of the item. As an alternative, the items stored in the stocking zone 330 are stored in accordance with the specification, that is, a whole box, of the items. The pre-replenishment amount may be an integral multiple of the storage specification of the item container, or less than the storage specification of the item container. The type of item container is determined according to the pre-replenishment amount and the storage specification. For example, if the pre-replenishment amount is an integral multiple of the storage specification of the item container, the item container may be a tray shelf, which is convenient to accommodate a whole tray of items. If the pre-replenishment amount is less than the storage specification of the item container, the item container may be a partition plate shelf, which is convenient to accommodate items parted from a whole tray. The structures of the tray shelf and the partition plate shelf will be described later.

The first transporting instruction may include a traveling path of the first robot for this replenishment task, the name of the items to be replenished. the amount of the items to be replenished, the storage position of the items and the like in the stocking zone 330. The item container refers to an implement for carrying an item, such as may be a shelf, cage car and the like. Alternatively, in this embodiment, the item container may include at least one of a tray shelf and a partition plate shelf.

Specifically, the control server 320 is configured to, in a case where it is determined that the item in the picking zone needs to be replenished, generate the replenishment task for the item that needs to be replenished and send the first transporting instruction to the first robot according to the replenishment task. The first robot is configured to, in response to the first transporting instruction, travel to the storage position of the items to be replenished in the stocking zone 330 according to the traveling path included in the first transporting instruction, obtain the items associated with the replenishment task from the stocking zone 330 according to the amount of the items to be replenished included in the first transporting instruction, and carry the obtained items to the picking zone 340 so that the item may be replenished into the item container in the picking zone 340.

With the technical solution provided by embodiments of the present disclosure, the control server is configured to, in the case where it is determined that the item in the picking zone needs to be replenished, automatically generate the replenishment task for the item that needs to be replenished and send the first transporting instruction to the first robot according to the replenishment task; the first robot is configured to, in response to the first transporting instruction, obtain the item associated with the replenishment task from the stocking zone, and carry the obtained item to the picking zone so that the item may be replenished into the item container in the picking zone, thereby achieving the automatic replenishment of the picking zone. In this scheme, an inventory amount of items in the picking zone is monitored in real time by the control server, and the automatic replenishment is carried out in the case where it is determined that the item in the picking zone need to be replenished, which may ensure that the amount of the items is sufficient and no waiting is needed in a case where the picking staff picks the item, and further improve the picking efficiency. Furthermore, the automatic replenishment of picking zone may be implemented without human interference by using the robot to seamlessly connect the picking zone with the stocking zone. so that the replenishment efficiency is improved and the labor cost is reduced. Moreover, the intelligent degree of the warehouse is improved, the logistics circulation speed of the e-commerce company is accelerated and the utilization rate of the warehouse is improved, thereby promoting the service quality and customer satisfaction of the e-commerce service company.

Figure 8B:
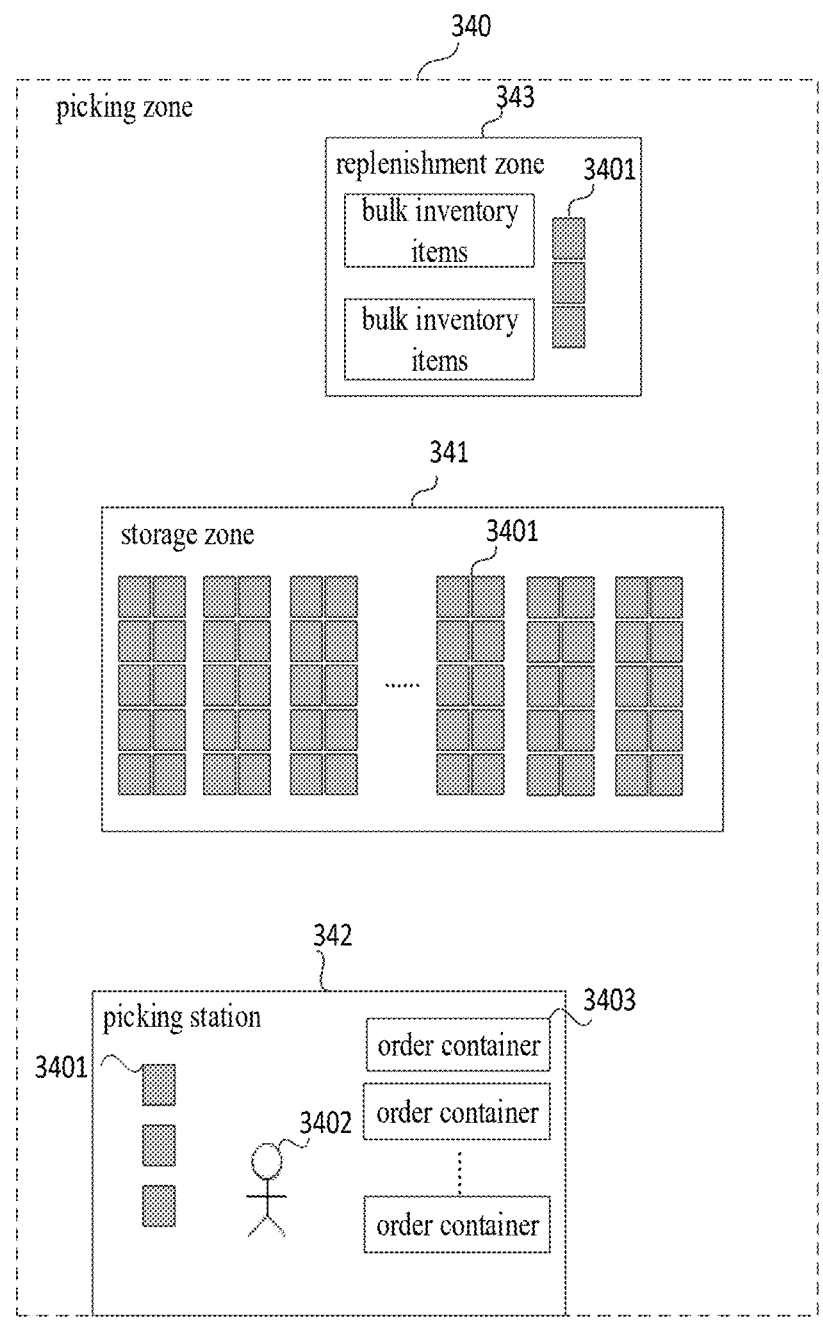
FIG. 8B is a schematic structural diagram of a picking zone applied to embodiments of the present disclosure.

In order not to affect the operation of the picking zone, by way of example, referring to the schematic structural diagram of the picking zone shown in FIG. 8B, the picking zone 340 may include a storage zone 341, a picking station 342 and a replenishment zone 343, and the item container 3401 is located in the storage zone 341. The replenishment zone 343 refers to a zone provided in the picking zone 340 for temporarily replenishing the items; the storage zone 341 refers to a zone within the picking zone 340 specifically used for replenishing the items to be replenished; the picking station 342 refer to a zone within the picking zone 340 specifically used for picking the items. Optionally, the replenishment zone 343, the storage zone 341, and the picking station 342 are identified differently to facilitate differentiation by the robot 310. Accordingly, the first transporting instruction may further include a zone identifier of the replenishment zone 343. Accordingly, the first robot may be further configured to transport the bulk inventory items associated with the replenishment task from the stocking zone 330 to the replenishment zone 343 as indicated by the first transporting instruction. In this embodiment, the control server 320 determines that the items in the picking zone 340 need to be replenished, that is, the control server 320 determines that items in the storage zone 341 in the picking zone 340 need to be replenished.

The first robot may be a forklift that is used to fork a tray from a high-level shelf on which the bulk inventory items is placed. As an alternative, the first robot may remove the container with a knocked-down item placed therein from the shelf in a gripping manner. See FIG. 2F for a schematic structural diagram of a gripping structure of the first robot. The first robot has a robot configuration shown in FIG. 1B. but the first robot is further provided with a grabbing device, as shown in FIG.

2F, including a telescopic assembly 51 for grabbing the storage container. The grabbing device further includes a lifting assembly 52 which lifts and/or descends the telescopic assembly 51 to a preset height. The telescopic assembly 51 includes a clamping part 511 and a sliding portion 512, in which the clamping part 511 grabs the storage container or the item from the shelf by a clamping manner. the clamping part 511 is slidably connected with the sliding portion 512. and the clamping portion 511 may slide in the depth direction of the shelf plate through the sliding portion 512.

The clamping portion 511 may include a first gripper 5111 and a second gripper 5112 which are oppositely arranged on the left and right sides of the separation layer. The first gripper and the second gripper may have a plate-like structure, or other structures such as a rod-shaped structure. The clamping portion 511 may include a non-slip pad 5113 arranged on inner sides of the first griper 5111 and the second gripper 5112. The non-slip pad 5113 is foldable, and the non-slip pad 5113 is folded when the clamping portion 511 does not grab the storage container or the item, and the non- slip pad 5113 is developed when the clamping portion 511 grabs the storage container.

By way of example, the robot 310 may further include a second robot; in which the control server 320 is further configured to determine the item container 3401 to which the bulk inventory items is replenished and to send a second transporting instruction to the second robot; and the second robot is configured to, in response to the second transporting instruction, carry the item container 3401 to which the bulk inventory items needs to be replenished from the storage zone 341 to the replenishment zone 343 as indicated by the second transporting instruction. The second transporting instruction may include a traveling path of the second robot for this replenishment task, and an identity, such as a number of the item container 3401 associated with the item to be replenished. Moreover, the item container 3401 carried by the second robot is empty.

With reference to a schematic structural diagram of the second robot shown in FIG. 1B, the second robot may include a drive mechanism 111 through which the second robot may move in the working space. The second robot may further include a lifting mechanism 112 for picking the shelf. In a case where the item container 3401 is a shelf, and the picking zone 340 needs to be replenished. the second robot may move to below a target shelf 3401, and the second robot may lift the target shelf 3401 by means of the lifting mechanism 112 and transport the target shelf 3401 to the replenishment zone 343. When the lifting mechanism 112 rises, the entire target shelf 3401 is lifted from the ground, allowing the second robot to transport the target shelf 3401. When the lifting mechanism 112 descends, the target shelf 3401 is laid on the ground. When the second robot lifts the target shelf 3401. a target identification component 113 on the second robot may effectively identify the target shelf 3401.

In addition to this, if the robot is based on visual navigation, the second robot may further include a navigation identification component (not shown in FIG. 1B) for identifying a navigation mark (such as a quick response code) laid on the ground. Apparently, the second robot may further include a control module that controls the entire robot to achieve motion, navigation, and the like (not shown in FIG. 1B). In an example, the second robot may travel forward according to the quick response code (or other ground identification marks) captured by the camera, and may travel to below the target shelf 3401 instructed by the control server 320 according to the route determined by the control server 320. The robot 310 transports the target shelf 3401 to the replenishment zone 343 where the bulk inventory items are placed into the target shelf 3401 associated with the bulk inventory items by a worker or other automated equipment to replenish the item needed for the picking zone.

After detecting that the second robot carries the item container 3401 from the storage zone 341 to the replenishment zone 343, the control server 320 sends a replenishment instruction to the first robot; in response to the replenishment instruction, the first robot places the bulk inventory items associated with the replenishment task into the item container 3401 to which the item needs to be replenished according to the instruction of the replenishment instruction; then the control server 320 sends a fourth transporting instruction to the second robot after detecting that the first robot places all the bulk inventory items associated with the replenishment task in the item container 3401 to which the items need to be replenished; in response to the fourth transporting instruction, the second robot carries the item container 3401 carrying the item from the replenishment zone 343 to the corresponding zone in the storage zone 341 according to the instruction of the fourth transporting instruction, thereby completing automatic replenishment of the item in the picking zone.

In a case where the picking station 342 needs to pick the item stored in the storage zone 341, the control server 320 may further be configured to receive an order task and send a third transporting instruction to the second robot according to the order task; and the second robot is further configured to, in response to the third transporting instruction, carry the item container 3401 in which an order item associated with the order task is located from the storage zone 341 to the picking station 342 as indicated by the third transporting instruction, so that a picking staff or other automated equipment such as a robotic arm within the picking station 342 picks the bulk inventory items. For example, in a case where the target item needs to be picked, the second robot carries the target shelf to the picking station where a picking staff or other automated equipment (e.g. a robotic arm) picks from the target shelf and places it into an order container (e.g. a circulation box on a picking wall) for packaging.

EIGHTH EMBODIMENT

FIG. 9 is a flow chart of a method for automatic replenishment provided by a second embodiment of the present disclosure. The present embodiment is applicable to replenishing items in a picking zone in an intelligent warehouse system. The entire method may be performed by the control server in cooperation with the at least one robot. Referring to FIG. 9, the method specifically includes:

In step S310, in a case where it is determined that an item in the picking zone needs to be replenished, the control server generates a replenishment task for the item that needs to be replenished and sends a first transporting instruction to a first robot according to the replenishment task.

The picking zone refers to a zone for picking the items according to an order of a user; the replenishment task refers to a task for replenishing the item generated in a case where the control server detects that the item in the picking zone is out of stock in a daily picking operation process. Optionally, the control server determining that the item in the picking zone needs to be replenished may include: the control server calculates an inventory amount of the items in the picking zone, and if the inventory amount is less than or equal to a preset security inventory threshold, it is determined that the item needs to be replenished.

In this embodiment, the inventory amount refers to the number of items currently placed in the picking zone; the security inventory threshold refers to a range of the number of items which may meet the required amount in the daily picking operation process. The security inventory threshold may be for one day, one week or one month, etc. The security inventory threshold may include an upper threshold and a lower threshold. Different items may have different or same security inventory thresholds. Optionally, the security inventory threshold may be set for each item according to historical sales and/or forecast data of the item. The forecast data refers to a forecast value set for the peak period of the purchase, such as "Double Eleven" and "6.18", and may be forecast according to the historical sales amount of the time period. In the present embodiment, the security inventory threshold is set according to the historical sales amount of items, which may improve the replenishment timeliness and picking efficiency, and ensure the sufficiency of items.

Specifically, the replenishment task refers to a task for replenishing the item generated in the case where the control server detects that the item in the picking zone is out of stock in a daily picking operation process, that is, the inventory amount is less than or equal to a preset security inventory threshold. Optionally, the replenishment task may include the name of the replenished item, the replenishment amount and the storage position of the item in the stocking zone.

It should be noted that since the items stored in the stocking zone are stored according to the original package of the items, that is, the whole box, the replenishment amount in the replenishment task may be equal to or greater than the demand of the items; and the replenishment amount is an integral multiple of the original package. For example, the replenishment amount of an item that needs to be replenished is 55. but the item is packed in a box of 10 pieces. thus the replenishment amount of the item in the replenishment task will be 60, that is, 6 boxes.

In order to ensure the sufficiency of items, the control server will detect the inventory amount of items in the picking zone in real time. In a case where it is detected that the inventory amount of multiple items in the picking zone is lower than the lower limit of the security inventory threshold corresponding to each item, the replenishment task corresponds to replenishing multiple items. Specifically, in a case where the control server detects that the inventory amount of one or more items in the picking zone is lower than the lower limit value of the security inventory threshold corresponding to each item, the replenishment task of the items is generated according to the inventory amount and the security inventory threshold of each item.

The first transporting instruction may include a traveling path of the first robot for this transport task, as well as the name of the items to be replenished. the amount of the items to be replenished, the storage position of the items and the like in the stocking zone. After the control server generates the replenishment task for the item that needs to be replenished, it also needs to send the first transporting instruction to the first robot according to the replenishment task, so that the first robot is configured to, in response to the first transporting instruction, carry the item that needs to be replenished to the picking zone, thereby further completing the replenishment of the picking zone.

In step S320, in response to the first transporting instruction, the first robot carries the item associated with the replenishment task from the stocking zone to the picking zone as indicated by the first transporting instruction to allow the item to be replenished into an item container in the picking zone.

The stocking zone refers to a zone specially used for storing a large number of items in the storage system; the picking zone refers to a zone for picking the items according to an order of a user; the item container refers to an apparatus for carrying items, such as a shelf. a cage car, etc. Optionally, in the present embodiment, the item container may include at least one of a tray shelf and a partition plate shelf.

Specifically, after generating the replenishment task, the control server sends the first transporting instruction to the first robot according to the replenishment task. The first robot is configured to, in response to the first transporting instruction, travel to the storage position of the item that needs to be replenished in the stocking zone according to the traveling path included in the first transporting instruction, obtains the item associated with the replenishment task from the stocking zone according to the replenishment amount included in the first transporting instruction, and transports the obtained items to the picking zone, so that the items may be replenished into the item container in the picking zone.

In order not to affect the operation of the picking zone, by way of example, the picking zone may include a replenishment zone, a storage zone, etc., and the item container is located in the storage zone; the replenishment zone refers to a zone set in the picking zone for temporarily replenishing the items; the storage zone refers to a zone in the picking zone dedicated to storing the items to be picked. Optionally, the replenishment zone and storage zone are different from the corresponding zone identifier, which is convenient for the robot to distinguish them. Correspondingly, the first transporting instruction may also include the zone identifier of the replenishment zone. The first robot is configured to, in response to the first transporting instruction, carry the item associated with the replenishment task from the stocking zone to the picking zone may include: the first robot is configured to, in response to the first transporting instruction, carry the item associated with the replenishment task from the stocking zone to the picking zone as indicated by the first transporting instruction.

In the present embodiment, the control server determines that the items in the picking zone need to be replenished, that is, the control server determines that items in the storage zone within the picking zone need to be replenished. Therefore, in order to improve the replenishment efficiency. two robots with different structures may be selected to cooperate with each other to realize the automatic replenishment of items from the stocking zone to the picking zone. Optionally, after the first robot is configured to, in response to the first transporting instruction, carry the item associated with the replenishment task from the stocking zone to the replenishment zone as indicated by the first transporting instruction, the method further includes: the control server determines an item container to which the item is replenished and sends a second transporting instruction to a second robot; the second robot is configured to, in response to the second transporting instruction, carry an item container to which the item needs to be replenished from the storage zone to the replenishment zone as indicated by the second transporting instruction so that the item may be replenished into the item container to which the item needs to be replenished. The second transporting instruction may include a traveling path of the second robot in this transport task, and an identifier such as a label of the item container associated with the replenished items. The item container carried by the second robot at this time is empty.

The control server sends the replenishment instruction to the first robot after detecting that the second robot transports the item container from the storage zone to the replenishment zone; the first robot is configured to, in response to the first transporting instruction, place the item associated with the replenishment task in the item container where the item needs to be replenished according to the instructions of the replenishment instruction; then, after detecting that the first robot places all the items associated with the replenishment task in the item container where the item needs to be replenished, the control server sends a fourth transporting instruction to the second robot; the second robot, in response to the fourth transporting instruction, transports the item containers carrying the items from the replenishment zone to the corresponding zone in the storage zone according to the instruction of the fourth transporting instruction, thereby completing the automatic replenishment of items in the picking zone.

The first robot is one of all first robots in the stocking zone that are in an idle state; correspondingly, the second robot is one of all second robots in the picking zone that are in an idle state.

The specific operation process is: in a case where it is determined that the item in the picking zone needs to be replenished. the control server generates the replenishment task for the item that needs to be replenished, and sends the first transporting instruction to the first robot according to the replenishment task; the first robot is configured to, in response to the first transporting instruction, travel to a shelf where the item associated with the replenishment task is stored in the stocking zone according to the traveling path included in the first transporting instruction, a storage position of the item in the replenishment task in the stocking zone and an autonomous navigation function, grab the items with an amount corresponding to a replenishment amount in the replenishment task by using a grabbing device and place same in a zone where the item is loaded, and transport the obtained items to the replenishment zone; a lifting mechanism may also be utilized to transport the shelf of item associated with the replenishment task entirely to the replenishment zone. After detecting that the first robot carries the item associated with the replenishment task to the replenishment zone, the control server determines the item container to which the items are replenished, and sends the second transporting instruction to the second robot; the second robot is configured to, in response to the second transporting instruction, carry the item container to which the item needs to be replenished from the storage zone to the replenishment zone as indicated by the second transporting instruction. After detecting that the second robot carries the item container from the storage zone to the replenishment zone. the control server sends the replenishment instruction to the first robot; the first robot is configured to, in response to the replenishment instruction, place the item onto the item container via the grabbing device or place the item onto the item container by a picking staff as indicated by the replenishment instruction. Then the control server, after detecting that the first robot places all the items associated with the replenishment task in the item container to which the item needs to be replenished, sends the fourth transporting instruction to the second robot, and the second robot, in response to the fourth transporting instruction, transports the item container carrying the item to the storage zone, thereby realizing automatic replenishment in the picking zone. Furthermore. the robot is used to seamlessly connect the picking zone with the stocking zone, which improves the replenishment efficiency. Since the control server monitors the inventory amount of the items in the picking zone in real time, and automatically replenishes the items in a case where the inventory amount is less than the security inventory threshold of the item, it may ensure that the amount of the items is sufficient in a case where the picking staff picks the items, there is no need to wait, and the picking efficiency is further improved.

Illustratively, the picking zone may further include a picking station; the picking station is a zone within the picking zone that is dedicated to picking the items. In a case where the picking station needs to pick the items stored in the storage zone, or after the second robot is configured to, in response to the fourth transporting instruction, transport the item container carrying the item from the replenishment zone to the storage zone, may further include: the control server receives an order task and sends the third transporting instruction to the second robot according to the order task; the second robot is configured to, in response to the third transporting instruction, carry the item container in which an order item associated with the order task is located from the storage zone to the picking station as indicated by the third transporting instruction, so that the picking staff or robotic arm in the picking station picks the item. The third transporting instruction may include the amount of the order item associated with the order task, an identifier of the item container where the order item is located. a number of the picking station, and a traveling path to the picking station at the location of the item container and the like.

With the technical solution provided by embodiments of the present disclosure, in the case where it is determined that the item in the picking zone needs to be replenished, the control server automatically generates the replenishment task for the item that needs to be replenished, and sends the first transporting instruction to the first robot according to the replenishment task; the first robot is configured to, in response to the first transporting instruction, obtain the item associated with the replenishment task from the stocking zone and transport the obtained item to the picking zone so that the item may be replenished into the item container of the picking zone, thereby achieving automatic replenishment of the picking zone. In this scheme, the inventory amount of items in the picking zone is monitored in real time by the control server, and the automatic replenishment is carried out in the case where it is determined that the item in the picking zone need to be replenished. which may ensure that the amount of the items is sufficient and no waiting is needed in a case where the picking staff picks the item, and further improve the picking efficiency. Furthermore, the automatic replenishment of picking zone may be implemented without human interference by using the robot to seamlessly connect the picking zone with the stocking zone, so that the replenishment efficiency is improved and the labor cost is reduced. Moreover, the intelligent degree of the warehouse is improved, the logistics circulation speed of the e-commerce company is accelerated and the utilization rate of the warehouse is improved, thereby promoting the service quality and customer satisfaction of the e-commerce service company.

NINTH EMBODIMENT

FIG. 10 is a flow chart of a method for automatic replenishment provided by a third embodiment of the present disclosure. In the present embodiment, a replenishment task generated by the control server for items that need to be replenished is further explained according to the above-described embodiments. Referring to FIG. 10, the method specifically includes the following steps.

In step S410, the control server calculates an inventory amount of the items in a picking zone, and if the inventory amount is less than or equal to a preset security inventory threshold, it is determined that the item needs to be replenished.

Specifically, in a case where the control server detects that the inventory amount of the items in the picking zone is less than or equal to a lower limit value of the preset security inventory threshold, it is determined that the item needs to be replenished.

In step S420, the control server determines a pre-replenishment amount of the item according to a difference between a security inventory threshold and the inventory amount.

The pre-replenishment amount refers to the number of the item to be picked out of stock in the picking zone, and may be obtained by subtracting the inventory amount of the item from the security inventory upper threshold of the item. For example, the inventory amount of an item A in the picking zone is 45, the security inventory threshold of the item A is 50-100, a lower limit value of the security inventory is 50, an upper limit value of the security inventory is 100, and the pre- replenishment amount required by the item A is 55 by subtracting the inventory amount 45 of the item A in the picking zone from the upper limit value 100 of the security inventory.

In step S430, the control server determines an actual replenishment amount of the item according to the pre-replenishment amount and a storage specification of the item in the stocking zone.

The storage specification refers to a maximum storage amount of a certain item that may be accommodated by a storage container. If the storage container is a storage box, the item is clothes. and the storage specification refers to the number of clothes when the entire box is filled with the clothes, for example, ten pieces for one box. Different items may have different or same storage specifications.

It should be noted that the items stored in the stocking zone are stored in accordance with the specification, that is, a whole box, of the items. The actual replenishment amount of the item is an integral multiple of the storage specification of the item in the stocking zone, and the actual replenishment amount of the item is equal to or greater than the pre-replenishment amount of the item. For example, in a case where the pre-replenishment amount of the item A is 55 and the storage specification of the item A in the stocking zone is one box 10, the actual replenishment amount of the item is 60.

In step S440, the control server generates the replenishment task for the item according to the actual replenishment amount of the item.

Specifically, after the actual replenishment amount of the item is determined, the control server generates the replenishment task according to the actual replenishment amount of the item. the name of the item, the storage position of the item and the like in the stocking zone.

In step S450, the control server sends the first transporting instruction to the first robot according to the replenishment task.

In step S460, in response to the first transporting instruction, the first robot carries an item associated with the replenishment task from the stocking zone to the picking zone as indicated by the first transporting instruction to allow the item to be replenished into an item container in the picking zone.

With the technical solution provided by embodiments of the present disclosure, the control server determines the actual replenishment amount of the item according to the inventory amount of the item in the picking zone, the security inventory threshold of the item and the storage specification of the item in the stocking zone, and generates the replenishment task according to the actual replenishment amount, and sends the first transporting instruction to the first robot according to the replenishment task. The first robot is configured to, in response to the first transporting instruction, carry the item associated with the replenishment task from the stocking zone, and transports the obtained items to the picking zone, so that the items may be replenished into the item container in the picking zone, thereby achieving the automatic replenishment of the picking zone. In this scheme, the replenishment timeliness and picking efficiency may be improved by setting the security inventory threshold, and the automatic replenishment of picking zone may be implemented without human interference by using the robot to seamlessly connect the picking zone with the stocking zone, so that the replenishment efficiency is improved and the labor cost is reduced. Moreover, the intelligent degree of the warehouse is improved, the logistics circulation speed of the e-commerce company is accelerated and the utilization rate of the warehouse is improved, thereby promoting the service quality and customer satisfaction of the e-commerce service company.

TENTH EMBODIMENT

Figure 11:
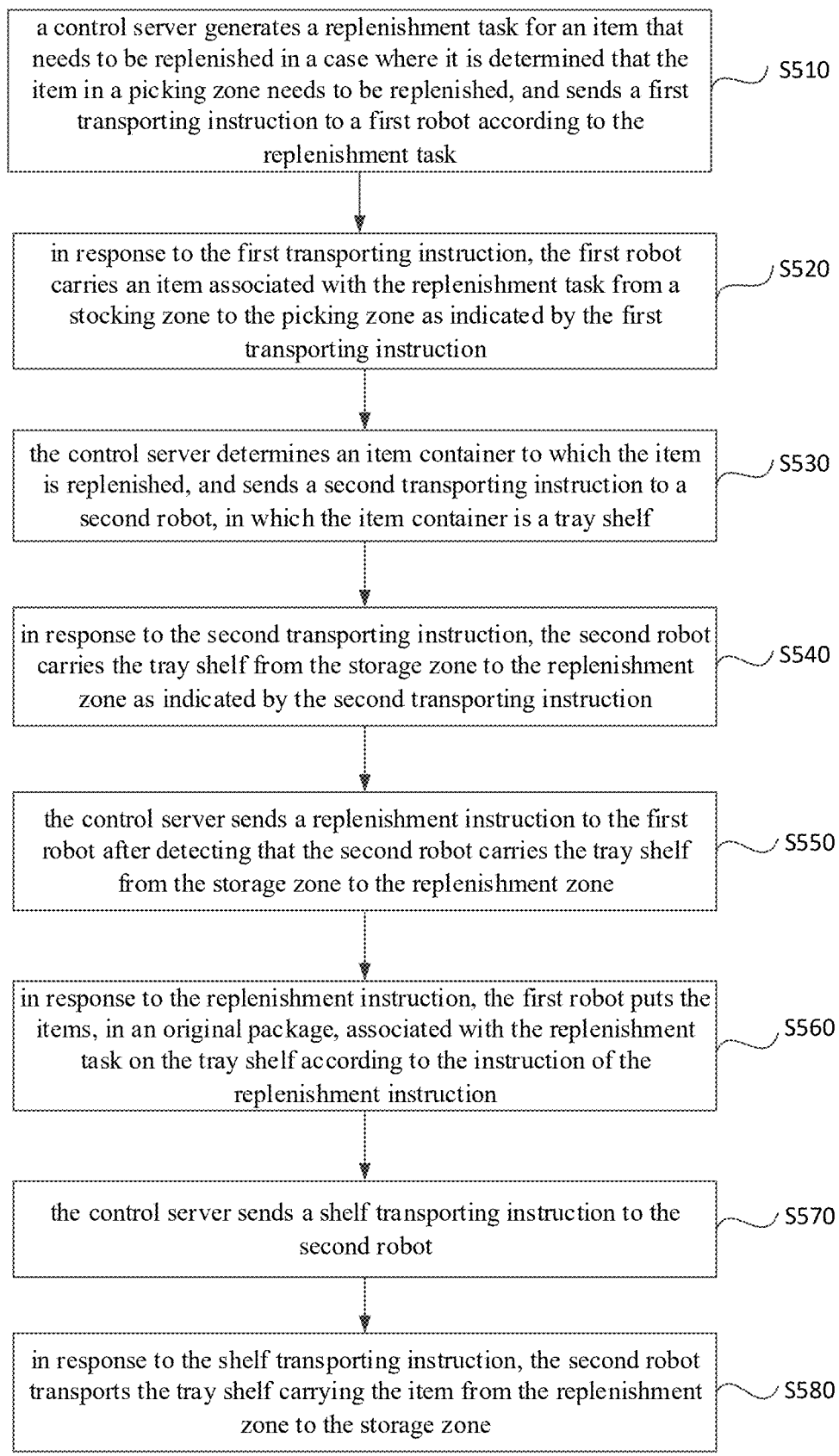
FIG. 11 is a flow chart of a method for automatic replenishment provided by a fourth embodiment of the present disclosure.

FIG. 11 is a flow chart of a method for automatic replenishment provided by a fourth embodiment of the present disclosure. This embodiment provides a preferred example according to the foregoing embodiments. Referring to FIG. 11, the method specifically includes the following steps.

In step S510, a control server generates a replenishment task for an item that needs to be replenished in a case where it is determined that the item in a picking zone needs to be replenished, and sends a first transporting instruction to a first robot according to the replenishment task.

In step S520, in response to the first transporting instruction, the first robot carries an item associated with the replenishment task from a stocking zone to the picking zone as indicated by the first transporting instruction.

In step S530, the control server determines an item container to which the item is replenished, and sends a second transporting instruction to a second robot, in which the item container is a tray shelf.

In step S540, in response to the second transporting instruction, the second robot carries the tray shelf from the storage zone to the replenishment zone as indicated by the second transporting instruction.

The tray shelf is also referred to as a beam shelf, which is a heavy shelf that may hold the tray and is formed by connecting horizontal pull rods, vertical pull rods, and beams. FIG. 7A is a schematic structural diagram of the tray shelf according to an embodiment of the present disclosure. Reference numeral 710 in the figure represents a tray which may accommodate one or more items 7. The type, specification, and dimension of the tray in the tray shelf may be determined according to the storage specification and weight of the item in the actual situation. By way of example, the tray shelf includes one or more vertical pull rods 720 as the support portion.

Specifically, when the control server detects that there is an available tray shelf in the storage zone and there is only one available tray shelf. this tray shelf is used as the item container to which the item is replenished, and the control server may select one second robot from all the second robots that are idle in the picking zone according to an optimal path principle. If there are multiple tray shelves, the control server may select an empty tray shelf from the storage zone as the item container to which the item is replenished according to the actual replenishment amount and the like, and establish the correlation between the tray shelf and the replenishment task of the items, and calculate, according to the optimal path principle, the distance between each idle second robot in the picking zone and the tray shelf to determine the second robot.

After determining the second robot, the control server sends the second transporting instruction to the second robot, in which the second transporting instruction may include a path plan between the second robot and a position of the tray shelf and a path plan between the position of the tray shelf and a position of items associated with the replenishment task in the replenishment zone; the second robot is configured to, in response to the second transporting instruction, carry the tray shelf to the position of items associated with the replenishment task in the replenishment zone. It should be noted that the tray shelf transported by the second robot at this time is empty, and the tray shelf is already associated with the replenishment task.

In step S550, the control server sends a replenishment instruction to the first robot after detecting that the second robot carries the tray shelf from the storage zone to the replenishment zone.

In step S560, in response to the replenishment instruction, the first robot puts the items, in an original package, associated with the replenishment task on the tray shelf according to the instruction of the replenishment instruction.

The original package of the item refers to the storage specification of the item in the stocking zone, in other words. the item is directly put on shelf according to a whole box without being disassembled.

Specifically, in a case where the control server detects that the second robot carries the tray shelf to the position of items associated with the replenishment task in the replenishment zone, the control server sends the replenishment instruction to the first robot, and the first robot is configured to, in response to the replenishment instruction, puts the items, in the original package, associated with the replenishment task on the tray shelf.

In step S570, the control server sends a shelf transporting instruction to the second robot.

In step S580, in response to the shelf transporting instruction, the second robot transports the tray shelf carrying the item from the replenishment zone to the storage zone.

The shelf transporting instruction is for instructing the second robot to transport a shelf carrying the item from the replenishment zone to a position where the item is placed in the storage zone. Optionally, the shelf transporting instruction may include a path plan between a current position of the shelf and a position of the storage zone where the item is placed, so that the second robot transports the shelf carrying the item from the replenishment zone to the storage zone according to the autonomous navigation function.

Specifically, in a case where the control server detects that the first robot has put the item associated with the replenishment task on the tray shelf, the control server sends the shelf transporting instruction the second robot, so that the second robot transports the tray shelf carrying the items from the replenishment zone to the storage zone, thereby achieving automatic replenishment of the item in the picking zone.

With the technical solution provided by embodiments of the present disclosure, in a case where the control server determines that the items in the picking zone need to be replenished. the replenishment task is automatically generated for the items need to be replenished; then the picking zone is in seamless connection with the stocking zone based on the mutual cooperation of the first robot and the second robot, and the type of the shelf is flexibly selected according to the actual situation of the picking zone, so that automatic replenishment from the stocking zone to the picking zone may be achieved, and the replenishment efficiency and the picking efficiency is improved and the labor cost is reduced. Moreover, the intelligent degree of the warehouse is improved, the logistics circulation speed of the e-commerce company is accelerated and the utilization rate of the warehouse is improved, thereby promoting the service quality and customer satisfaction of the e-commerce service company.

Further embodiments are now described:

A $1^{st}$ embodiment provides a storage system for automatic replenishment, including: a control server and a first robot;

where the control server is configured to, in a case where it is determined that an item in a picking zone needs to be replenished, generate a replenishment task for the item that needs to be replenished and send a first transporting instruction to the first robot according to the replenishment task; and the first robot is configured to, in response to the first transporting instruction, carry an item associated with the replenishment task from a stocking zone to the picking zone as indicated by the first transporting instruction to allow the item to be replenished into an item container in the picking zone.

A $2^{nd}$ embodiment provides the system of the $1^{st}$ embodiment, where the picking zone includes a replenishment zone and a storage zone, the item container is located in the storage zone; and the first robot is further configured to carry the item associated with the replenishment task from the stocking zone to the replenishment zone as indicated by the first transporting instruction. A $3^{rd}$ embodiment provides the system of the $2^{nd}$ embodiment, further including a second robot; where the control server is further configured to determine an item container to which the item is replenished and to send a second transporting instruction to the second robot; and the second robot is configured to, in response to the second transporting instruction, carry an item container to which the item needs to be replenished from the storage zone to the replenishment zone as indicated by the second transporting instruction to allow the item to be replenished into the item container to which the item needs to be replenished.

A $4^{th}$ embodiment provides the system of the $3^{rd}$ embodiment, where the picking zone further includes a picking station;

the control server is further configured to receive an order task and send a third transporting instruction to the second robot according to the order task; and the second robot is further configured to, in response to the third transporting instruction, carry an item container in which an order item associated with the order task is located from the storage zone to the picking station as indicated by the third transporting instruction.

A $5^{th}$ embodiment provides the system of any one of the preceding embodiments, where the control server is further configured to calculate an inventory amount of the items in the picking zone. and if the inventory amount is less than or equal to a preset security inventory threshold, it is determined that the item needs to be replenished.

A $6^{th}$ embodiment provides the system of the $5^{th}$ embodiment, where the control server is further configured to determine a pre-replenishment amount of the item according to a difference between a security inventory threshold and the inventory amount, and determine at least one of an actual replenishment amount of the item and an item container specification according to the pre- replenishment amount and a storage specification of the item in the stocking zone, and generate the replenishment task for the item according to the actual replenishment amount of the item.

A $7^{th}$ embodiment provides the system of any one of the $1^{st}$ to $4^{th}$ embodiments, where the item container includes at least one of a tray shelf and a partition plate shelf.

An $8^{th}$ embodiment provides A method for automatic replenishment, including:

generating, by a control server, a replenishment task for an item that needs to be replenished in a case where it is determined that an item in a picking zone needs to be replenished, and sending a first transporting instruction to a first robot according to the replenishment task;

in response to the first transporting instruction, carrying, by the first robot, an item associated with the replenishment task from a stocking zone to the picking zone as indicated by the first transporting instruction to allow the item to be replenished into an item container in the picking zone. A $9^{th}$ embodiment provides the method of the $8^{th}$ embodiment, where the picking zone includes a replenishment zone and a storage zone, the item container is located in the storage zone; and carrying, by the first robot, the item associated with the replenishment task from the stocking zone to the picking zone as indicated by the first transporting instruction includes:

in response to the first transporting instruction, carrying, by the first robot, the item associated with the replenishment task from the stocking zone to the replenishment zone as indicated by the first transporting instruction.

A $10^{th}$ embodiment provides the method of the $9^{th}$ embodiment, where after in response to the first transporting instruction, carrying, by the first robot, the item associated with the replenishment task from the stocking zone to the replenishment zone as indicated by the first transporting instruction, the method further includes:

determining, by the control server, an item container to which the item is replenished and sending, by the control server, a second transporting instruction to a second robot; and in response to the second transporting instruction, carrying, by the second robot, an item container to which the item needs to be replenished from the storage zone to the replenishment zone as indicated by the second transporting instruction to allow the item to be replenished into the item container to which the item needs to be replenished.

An $11^{th}$ embodiment provides the method of the $10^{th}$ embodiments, where the picking zone further includes a picking station, and the method further includes:

receiving, by the control server, an order task, and sending, by the control server, a third transporting instruction to the second robot according to the order task; and in response to the third transporting instruction, carrying, by the second robot, an item container in which an order item associated with the order task is located from the storage zone to the picking station as indicated by the third transporting instruction.

A $12^{th}$ embodiment provides the method of any one of the $8^{th}$ to the $11^{th}$ embodiments, where determining, by the control server, that the item in the picking zone needs to be replenished includes:

calculating, by the control server, an inventory amount of the items in the picking zone, and if the inventory amount is less than or equal to a preset security inventory threshold, determining that the item needs to be replenished.

A $13^{th}$ embodiment provides the method of the $12^{th}$ embodiment, where generating, by the control server, the replenishment task for the item that needs to be replenished includes:

determining. by the control server, a pre-replenishment amount of the item according to a difference between a security inventory threshold and the inventory amount;

determining, by the control server, at least one of an actual replenishment amount of the item and an item container specification according to the pre-replenishment amount and a storage specification of the item in the stocking zone, and generating, by the control server, the replenishment task for the item according to the actual replenishment amount of the item.

A 14$^{th}$ embodiment provides the method of the 13$^{th}$ embodiment, where the item container includes at least one of a tray shelf and a partition plate shelf.

The invention claimed is:

1. An inventory system for preparing and picking goods, comprising a control server, a robot, an access device, a workstation, and an inventory zone for preparing and picking goods, wherein the access device and the robot communicate with the control server respectively; the inventory zone comprises a plurality of high shelves and a plurality of picking shelves, any high shelf of the plurality of high shelves comprises at least one plate, the at least one plate divides the high shelf into at least two layers, a picking shelf is placed at a bottom layer of at least one high shelf of the plurality of high shelves, at least one storage container is placed at each of layers other than the bottom layer where the picking shelf is placed, the storage container contains inventory items for replenishment of the picking shelf, and the picking shelf contains inventory items available for picking; wherein the control server is configured to determine, in response to an item replenishment request, a target picking shelf where the inventory item to be replenished is located, a first robot for transporting the target picking shelf, a target storage container for replenishment of the target picking shelf, a target high shelf for storing the target storage container, a first access device for taking out the target storage container, and a target workstation for replenishment operations; and is configured to plan traveling paths for the first robot and the first access device; and configured to send a control instruction to the first robot and the first access device;

the first robot is configured to travel, in response to the control instruction, to the high shelf where the target picking shelf is located according to the planned traveling path, and to identify the target picking shelf from the bottom layer of the high shelf and transport the target picking shelf to the target workstation; and the first access device is configured to travel, in response to the control instruction, to the target high shelf according to the planned traveling path, and to take out the target storage container from the target high shelf and transport the target storage container to the target workstation.

2. The inventory system according to claim 1, wherein the picking shelf comprises at least one plate, the at least one plate divides the picking shelf into at least two layers, and at least one picking container is placed on each layer of the picking shelf, and the picking container contains inventory items available for picking;

the control server is configured to determine, in response to the item replenishment request, a target picking container where the inventory item to be replenished is located and the picking shelf where the target picking container is located, the first robot for transporting the target picking container; to plan the traveling path for the first robot, and send a control instruction to the first robot;

the first robot is configured to travel, in response to the control instruction, to the picking shelf where the target picking container is located according to the planned traveling path, and to identify the target picking container from the picking shelf and transport the target picking container to the target workstation.

3. The system according to claim 1, wherein the first robot is further configured to always keep docking with the target picking shelf or the target picking container during the process that the target picking shelf or the target picking container is manipulated;

the first access device is further configured to always keep docking with the target storage container during the process that the target storage container is manipulated; and the first robot is further configured to transport the target picking shelf or the target picking container from the target workstation to the inventory zone after operations to the target picking shelf and the target picking container are finished; and the first access device is further configured to transport the target storage container from the target workstation to the inventory zone after operations to the target storage container are finished.

4. The system according to claim 1, wherein the first robot is further configured to wait for and execute other control instructions after placing the target picking shelf or the target picking container at a designated position of the target workstation; and the first access device is further configured to wait for and execute other control instructions after placing the target storage container at the designated position of the target workstation;

the control server is further configured to determine, in response to a replenishment completion request, a second access device for storing the target storage container, and a second robot for transporting the target picking shelf or the target picking container; plan traveling paths for the second robot and the second access device; and send the control instruction to the second robot and the second access device;

the second robot is configured to obtain, in response to the control instruction, the target picking shelf or the target picking container from the target workstation according to the planned traveling path, and transport the target picking shelf or the target picking container to the inventory zone; and the second access device is configured to obtain, in response to the control instruction, the target storage container from the target workstation according to the planned traveling path, and transport the target storage container to the inventory zone.

5. The system according to claim 1, wherein in a case that the target picking shelf where the inventory item to be replenished is a vacant tray shelf and the target storage container is a target tray, the control server is further configured to determine, in response to the item replenishment request, the target picking shelf where the inventory item to be replenished is located, the target storage container for replenishment of the target picking shelf, the target high shelf for storing the target storage container, and the first access device for taking out the target storage container; to plan the traveling path for the first access device; and to send the control instruction to the first access device; and the first access device is further configured to travel, in response to the control instruction, to the target high shelf according to the planned traveling path, and to take out the target storage container from the target high shelf and transport the target storage container to the target picking shelf, and place the target storage container on the target picking shelf.

6. The system according to claim 1, wherein the access device is an unmanned forklift, and a fork-extending direction of the unmanned forklift is perpendicular to a traveling direction of the forklift.

7. The system according to claim 1, wherein the control server is further configured to calculate an inventory amount of the items to be picked, and if the inventory amount is less than or equal to a preset security inventory threshold, it is determined that the item needs to be replenished.

8. The system according to claim 7, wherein the control server is further configured to determine a pre-replenishment amount of the item according to the difference between the security inventory threshold and the inventory amount, and determine at least one of an actual replenishment amount of the item and an item container specification according to the pre-replenishment amount and a storage specification of the item in the inventory zone, and generate a replenishment task for the item according to the actual replenishment amount of the item.

9. The system according to claim 1, wherein the picking shelf comprises at least one of a tray shelf and a partition plate shelf.

10. An inventory management method for preparing and picking goods, comprising
determining by a control server, in response to an item replenishment request, a target picking shelf where the inventory item to be replenished is located, a first robot for transporting the target picking shelf, a target storage container for replenishment of the target picking shelf, a target high shelf for storing the target storage container, a first access device for taking out the target storage container, and a target workstation for replenishment operations; planning traveling paths for the first robot and the first access device; and sending a first control instruction to the first robot and the first access device; wherein the target high shelf and the target picking shelf are located in an inventory zone for preparing and picking goods, the inventory zone comprises a plurality of high shelves and a plurality of picking shelves, any high shelf of the plurality of high shelves comprises at least one plate, the at least one plate divides the high shelf into at least two layers, a picking shelf is placed at a bottom layer of at least one high shelf of the plurality of high shelves, at least one storage container is placed at each of layers other than the bottom layer where the picking shelf is placed, the storage container contains inventory items for replenishment of the picking shelf, and the picking shelf contains inventory items available for picking;
instructing, in response to the first control instruction, the first robot to travel to the high shelf where the target picking shelf is located according to the planned traveling path, and to identify the target picking shelf from the bottom layer of the high shelf and transport the target picking shelf to the target workstation; and
instructing, in response to the first control instruction, the first access device to travel to the target high shelf according to the planned traveling path, and to take out the target storage container from the target high shelf and transport the target storage container to the target workstation.

11. The method according to claim 10, wherein the picking shelf comprises at least one plate, the at least one plate divides the picking shelf into at least two layers, and at least one picking container is placed on each layer of the picking shelf, and the picking container contains inventory items available for picking; the method further comprises:
determining by the control server, in response to the item replenishment request, a target picking container where the inventory item to be replenished is located and the picking shelf where the target picking container is located, the first robot for transporting the target picking container; planning the traveling path for the first robot; and sending the first control instruction to the first robot; and
instructing, in response to the first control instruction, the first robot to travel to the picking shelf where the target picking container is located according to the planned traveling path, and to identify the target picking container from the picking shelf and transport the target picking container to the target workstation.

12. The method according to claim 10, wherein
the first robot always keeps docking with the target picking shelf or the target picking container during the process that the target picking shelf or the target picking container is manipulated;
the first access device always keeps docking with the target storage container during the process that the target storage container is manipulated;
the control server sends a second control instruction to the first robot and the first access device when the control server detects that operations to the target storage container and the target picking shelf are finished or operations to the target storage container and the target picking container are finished;
the first robot, in response to the second control instruction, transports the target picking shelf or the target picking container from the target workstation to the inventory zone; and
the first access device, in response to the second control instruction, transports the target storage container from the target workstation to the inventory zone.

13. The method according to claim 10, wherein after the first access device travels, in response to the first control instruction, to the target high shelf according to the planned traveling path, and take out the target storage container from the target high shelf and transport the target storage container to the target workstation, the method further comprises:
the control server sends a placing instruction to the first robot and the first access device;
the first robot waits for and execute, in response to the placing instruction, other control instructions after placing the target picking shelf or the target picking container at a designated position of the target workstation; and
the first access device further waits for and execute, in response to the placing instruction, other control instructions after placing the target storage container at the designated position of the target workstation;
the control server determines, in response to the replenishment completion request, a second access device for storing the target storage container, and a second robot for transporting the target picking shelf or the target picking container; plans traveling paths for the second robot and the second access device; and sends a third control instruction to the second robot and the second access device;
the second robot obtains, in response to the third control instruction, the target picking shelf or the target picking container from the target workstation according to the planned traveling path, and transports the target picking shelf or the target picking container to the inventory zone; and the second access device obtains, in response to the third control instruction, the target storage container from the target workstation according to the planned traveling path, and transports the target storage container to the inventory zone.

14. The method according to claim 10, wherein in a case that the target picking shelf where the inventory item to be replenished is located is a vacant tray shelf and the target storage container is a target tray, the method further comprises:

the control server determines, in response to the item replenishment request, the target picking shelf where the inventory item to be replenished is located, the target storage container for replenishment of the target picking shelf, the target high shelf for storing the target storage container, and the first access device for taking out the target storage container; to plan the traveling path for the first access device; and sends a fourth control instruction to the first access device; and the first access device travels, in response to the fourth control instruction, to the target high shelf according to the planned traveling path, and takes out the target storage container from the target high shelf and transport the target storage container to the target picking shelf, and place the target storage container on the target picking shelf.

15. The method according to claim 10, wherein the access device is an unmanned forklift, and a fork-extending direction of the unmanned forklift is perpendicular to a traveling direction of the forklift.

16. The method according to claim 10, wherein a process of the control server determining that the item to be picked needs to be replenished comprises:

calculating by the control server an inventory amount of the items to be picked, and if the inventory amount is less than or equal to a preset security inventory threshold, it is determined that the item needs to be replenished.

17. The method according to claim 16, wherein a process of the control server generating a replenishment task for the item that needs to be replenished comprises:

determining by the control server a pre-replenishment amount of the item according to the difference between the security inventory threshold and the inventory amount;

determining by the control server at least one of an actual replenishment amount of the item and an item container specification according to the pre-replenishment amount and a storage specification of the item in the inventory zone, and generating a replenishment task for the item according to the actual replenishment amount of the item.

* * * * *